US012657595B2

(12) United States Patent
Chan et al.

(10) Patent No.: US 12,657,595 B2
(45) Date of Patent: Jun. 16, 2026

(54) DRIVER PROFILES BASED UPON RESPONSIVENESS TO VEHICLE ALERTS

(71) Applicant: STATE FARM MUTUAL AUTOMOBILE INSURANCE COMPANY, Bloomington, IL (US)

(72) Inventors: Leo Nelson Chan, Normal, IL (US); Jacob J. Alt, Downs, IL (US); Matthew S. Megyese, Phoenix, AZ (US); Steven C. Cielocha, Bloomington, IL (US); Kristopher Keith Gaudin, Bloomington, IL (US); Brian Mark Fields, Phoenix, AZ (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 7 days.

(21) Appl. No.: 18/441,296

(22) Filed: Feb. 14, 2024

(65) Prior Publication Data

US 2024/0185188 A1    Jun. 6, 2024

Related U.S. Application Data

(62) Division of application No. 15/784,813, filed on Oct. 16, 2017, now abandoned.

(Continued)

(51) Int. Cl.
*G06Q 30/0201* (2023.01)
*G06F 16/9535* (2019.01)
(Continued)

(52) U.S. Cl.
CPC ..... *G06Q 30/0201* (2013.01); *G06F 16/9535* (2019.01); *G06Q 10/1053* (2013.01);
(Continued)

(58) Field of Classification Search
CPC ........... G06Q 30/0201; G06Q 10/1053; G06Q 10/20; G06Q 30/0207; G06Q 30/0255;
(Continued)

(56) References Cited

U.S. PATENT DOCUMENTS 5,155,847 A * 10/1992 Kirouac .............. G06F 11/0793
717/170
5,442,553 A * 8/1995 Parrillo ................ G07C 5/0808
702/123

(Continued)

FOREIGN PATENT DOCUMENTS

CA          2805439 A1    11/2013
DE    102016006541 A1    11/2017
(Continued)

OTHER PUBLICATIONS

Karapiperis et al., CIPR Study "Usage-Based Insurance and Vehicle Telematics: Insurance Market and Regulatory Implications", Mar. 2015, National Association of Insurance Commicissioners & the Center for Insurance Policy and Research, whole document. (Year: 2015).

(Continued)

*Primary Examiner* — Bhavesh V Amin
(74) *Attorney, Agent, or Firm* — MARSHALL, GERSTEIN & BORUN LLP

(57) ABSTRACT

A computer-implemented method includes receiving software version data generated by an on-board system of a vehicle via a network, wherein the software version data indicates a version of software executed by the on-board system to control operational parameters of the vehicle. The method also includes determining, based at least upon (i) the software version data and (ii) a known current version of the software, whether a latest software update was installed for the on-board system, setting, based at least upon whether the latest software update was installed for the on-board system, (Continued)

at least a portion of a driver profile associated with the driver, and transmitting the at least the portion of the driver profile to a third party server.

18 Claims, 11 Drawing Sheets

Related U.S. Application Data

(60) Provisional application No. 62/528,682, filed on Jul. 5, 2017, provisional application No. 62/528,688, filed on Jul. 5, 2017, provisional application No. 62/528,689, filed on Jul. 5, 2017, provisional application No. 62/528,684, filed on Jul. 5, 2017, provisional application No. 62/528,687, filed on Jul. 5, 2017, provisional application No. 62/524,028, filed on Jun. 23, 2017, provisional application No. 62/524,200, filed on Jun. 23, 2017, provisional application No. 62/524,208, filed on Jun. 23, 2017, provisional application No. 62/524,209, filed on Jun. 23, 2017, provisional application No. 62/524,212, filed on Jun. 23, 2017, provisional application No. 62/414,295, filed on Oct. 28, 2016, provisional application No. 62/414,291, filed on Oct. 28, 2016.

(51) Int. Cl.

| | |
|---|---|
| *G06Q 10/1053* | (2023.01) |
| *G06Q 10/20* | (2023.01) |
| *G06Q 30/0207* | (2023.01) |
| *G06Q 30/0251* | (2023.01) |
| *G06Q 30/0601* | (2023.01) |
| *G06Q 40/02* | (2023.01) |
| *G06Q 40/03* | (2023.01) |
| *G06Q 40/08* | (2012.01) |
| *G07C 5/00* | (2006.01) |
| *G07C 5/08* | (2006.01) |

(52) U.S. Cl.
CPC ......... *G06Q 10/20* (2013.01); *G06Q 30/0207* (2013.01); *G06Q 30/0255* (2013.01); *G06Q 30/0269* (2013.01); *G06Q 30/0631* (2013.01); *G06Q 40/02* (2013.01); *G06Q 40/03* (2023.01); *G06Q 40/08* (2013.01); *G07C 5/006* (2013.01); *G07C 5/008* (2013.01); *G07C 5/08* (2013.01); *G07C 5/0808* (2013.01); *G07C 5/0841* (2013.01)

(58) Field of Classification Search
CPC ........... G06Q 30/0269; G06Q 30/0631; G06Q 40/02; G06Q 40/03; G06Q 40/08; G06F 16/9535; G07C 5/006; G07C 5/008; G07C 5/08; G07C 5/0808; G07C 5/0841; B60W 2520/10; B60W 2520/105; B60W 2554/802; B60W 40/09
See application file for complete search history.

(56) References Cited

U.S. PATENT DOCUMENTS

| | | | | |
|---|---|---|---|---|
| 5,797,134 | A | 8/1998 | McMillan et al. | |
| 5,835,008 | A | 11/1998 | Colemere, Jr. | |
| 5,848,064 | A * | 12/1998 | Cowan ................. | H04W 24/02 |
| | | | | 370/338 |
| 6,014,645 | A * | 1/2000 | Cunningham ......... | G06Q 40/00 |
| | | | | 235/379 |
| 6,308,061 | B1 * | 10/2001 | Criss .................... | H04W 24/02 |
| | | | | 455/418 |
| 6,324,692 | B1 * | 11/2001 | Fiske .................. | G06F 11/1433 |
| | | | | 714/E11.135 |
| 6,338,152 | B1 * | 1/2002 | Fera ........................ | B61L 27/57 |
| | | | | 714/48 |
| 6,360,366 | B1 * | 3/2002 | Heath ...................... | G06F 8/65 |
| | | | | 709/201 |
| 6,430,481 | B1 * | 8/2002 | Lovelace, II ........... | B61L 3/125 |
| | | | | 701/19 |
| 6,459,969 | B1 | 10/2002 | Bates et al. | |
| 6,580,975 | B2 * | 6/2003 | Lovelace, II ........... | B61L 3/125 |
| | | | | 701/19 |
| 6,658,330 | B2 * | 12/2003 | Delaruelle ................ | G06F 8/65 |
| | | | | 707/999.203 |
| 6,714,894 | B1 | 3/2004 | Tobey et al. | |
| 6,832,141 | B2 | 12/2004 | Skeen et al. | |
| 6,868,386 | B1 | 3/2005 | Henderson et al. | |
| 7,349,825 | B1 | 3/2008 | Williams et al. | |
| 7,457,693 | B2 | 11/2008 | Olsen et al. | |
| 7,571,036 | B2 | 8/2009 | Olsen et al. | |
| 7,683,774 | B2 | 3/2010 | Olsen et al. | |
| 7,714,778 | B2 * | 5/2010 | Dupray ................. | G01S 5/0252 |
| | | | | 342/357.31 |
| 7,778,752 | B1 | 8/2010 | Hunt et al. | |
| 7,792,328 | B2 | 9/2010 | Albertson et al. | |
| 7,890,653 | B2 | 2/2011 | Kutsumi et al. | |
| 7,903,029 | B2 * | 3/2011 | Dupray ................. | H04W 4/024 |
| | | | | 701/410 |
| 8,044,809 | B2 | 10/2011 | Farmer | |
| 8,244,779 | B2 | 8/2012 | Borg et al. | |
| 8,301,492 | B2 * | 10/2012 | Cordeiro ........... | G06Q 30/0225 |
| | | | | 705/14.54 |
| 8,355,983 | B1 * | 1/2013 | Parr ...................... | G06Q 40/03 |
| | | | | 705/37 |
| 8,390,474 | B2 | 3/2013 | Yi et al. | |
| 8,407,139 | B1 | 3/2013 | Palmer | |
| 8,412,406 | B2 * | 4/2013 | Johnson ............. | G06F 11/3409 |
| | | | | 340/901 |
| 8,416,067 | B2 | 4/2013 | Davidson et al. | |
| 8,577,703 | B2 | 11/2013 | McClellan et al. | |
| 8,799,036 | B1 | 8/2014 | Christensen et al. | |
| 8,836,490 | B2 | 9/2014 | Silzer, Sr. et al. | |
| 8,868,288 | B2 | 10/2014 | Plante et al. | |
| 8,892,310 | B1 | 11/2014 | Palmer et al. | |
| 8,897,953 | B2 | 11/2014 | Olsen, III et al. | |
| 8,902,081 | B2 | 12/2014 | Groeneweg | |
| 8,930,204 | B1 | 1/2015 | Igoe et al. | |
| 8,989,959 | B2 | 3/2015 | Plante et al. | |
| 9,026,304 | B2 | 5/2015 | Olsen, III et al. | |
| 9,053,516 | B2 | 6/2015 | Stempora | |
| 9,058,359 | B2 * | 6/2015 | Butler ................. | G06F 11/3003 |
| 9,070,243 | B1 | 6/2015 | Kozlowski et al. | |
| 9,164,957 | B2 | 10/2015 | Hassib et al. | |
| 9,201,842 | B2 | 12/2015 | Plante | |
| 9,245,393 | B2 | 1/2016 | Yagi et al. | |
| 9,286,266 | B1 | 3/2016 | Fleck et al. | |
| 9,311,271 | B2 | 4/2016 | Wright | |
| 9,430,883 | B2 | 8/2016 | Busse et al. | |
| 9,536,197 | B1 | 1/2017 | Penilla et al. | |
| 9,558,520 | B2 * | 1/2017 | Peak ...................... | G01C 21/36 |
| 9,633,487 | B2 | 4/2017 | Wright | |
| 9,639,344 | B2 * | 5/2017 | Rockwell ................. | G06F 8/65 |
| 9,830,748 | B2 | 11/2017 | Rosenbaum | |
| 9,916,557 | B1 * | 3/2018 | Gillen ................... | G06Q 50/00 |
| 9,973,831 | B2 | 5/2018 | Mejegård et al. | |
| 9,990,782 | B2 | 6/2018 | Rosenbaum | |
| 10,032,216 | B2 * | 7/2018 | Binion ................... | G06Q 30/08 |
| 10,037,689 | B2 | 7/2018 | Taylor | |
| 10,192,369 | B2 | 1/2019 | Wright | |
| 10,198,879 | B2 | 2/2019 | Wright | |
| 10,242,336 | B1 * | 3/2019 | Agarwal ............. | G06Q 10/083 |
| 10,269,190 | B2 | 4/2019 | Rosenbaum | |
| 10,347,058 | B2 | 7/2019 | Pursifull et al. | |
| 10,354,330 | B1 | 7/2019 | Konrardy et al. | |
| 10,366,370 | B1 | 7/2019 | Binion et al. | |
| 10,467,824 | B2 | 11/2019 | Rosenbaum | |
| 10,482,685 | B1 | 11/2019 | Iqbal et al. | |
| 10,510,123 | B1 | 12/2019 | Konrardy et al. | |
| 10,726,639 | B2 * | 7/2020 | Rai ........................ | G07C 5/006 |

(56) References Cited

U.S. PATENT DOCUMENTS

| 10,803,529 | B2 * | 10/2020 | Adams .................. G06Q 40/08 |
| 10,832,261 | B1 | 11/2020 | Chan et al. |
| 10,845,800 | B2 * | 11/2020 | Krishnamurthy ........................... B60W 60/00186 |
| 10,984,479 | B1 | 4/2021 | Kyne et al. |
| 11,004,081 | B2 * | 5/2021 | Ahuja ............... G06Q 20/4016 |
| 11,017,057 | B1 * | 5/2021 | Arazi ..................... G06F 17/18 |
| 11,037,177 | B1 | 6/2021 | Chan et al. |
| 11,080,792 | B1 * | 8/2021 | Loo ......................... G06Q 40/08 |
| 11,227,452 | B2 | 1/2022 | Rosenbaum |
| 11,250,445 | B2 * | 2/2022 | Jobin ............... G06Q 30/0201 |
| 11,354,112 | B2 * | 6/2022 | Noda ........................ G06F 8/65 |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 11,599,947 | B1 * | 3/2023 | Gross ..................... G06Q 40/02 |
| 11,869,063 | B2 * | 1/2024 | Key ................... G01C 21/3461 |
| 11,989,749 | B2 * | 5/2024 | Scholl .................... B60K 35/85 |
| 12,125,107 | B2 * | 10/2024 | Saban ................... G06Q 40/08 |
| 12,159,315 | B1 * | 12/2024 | Raubenheimer ....... G06Q 40/08 |
| 2002/0016655 | A1 | 2/2002 | Joao |
| 2002/0095249 | A1 | 7/2002 | Lang |
| 2002/0133365 | A1 * | 9/2002 | Grey ................. G06Q 30/0201 705/7.29 |
| 2003/0004622 | A1 * | 1/2003 | Lovelace, II .......... B61L 27/57 701/19 |
| 2003/0062025 | A1 | 4/2003 | Samoto et al. |
| 2003/0083060 | A1 | 5/2003 | Menendez |
| 2003/0224818 | A1 | 12/2003 | Nagasaka et al. |
| 2003/0229553 | A1 * | 12/2003 | Kongyingyong ...... G06Q 10/10 705/35 |
| 2004/0039494 | A1 | 2/2004 | Kaufman |
| 2004/0039611 | A1 | 2/2004 | Hong et al. |
| 2004/0088095 | A1 | 5/2004 | Eberle et al. |
| 2004/0155783 | A1 | 8/2004 | Al-Sheikh |
| 2004/0203379 | A1 | 10/2004 | Witkowski et al. |
| 2004/0209594 | A1 | 10/2004 | Naboulsi |
| 2004/0225422 | A1 | 11/2004 | Doherty et al. |
| 2005/0080718 | A1 * | 4/2005 | Desai ..................... G06Q 40/03 705/38 |
| 2005/0203683 | A1 | 9/2005 | Olsen et al. |
| 2006/0055564 | A1 | 3/2006 | Olsen et al. |
| 2007/0013498 | A1 | 1/2007 | Knoll et al. |
| 2007/0027726 | A1 | 2/2007 | Warren et al. |
| 2007/0124046 | A1 | 5/2007 | Ayoub et al. |
| 2007/0156455 | A1 * | 7/2007 | Tarino .................... G06Q 10/00 705/2 |
| 2007/0226014 | A1 | 9/2007 | Alemayehu et al. |
| 2007/0247282 | A1 | 10/2007 | Olsen et al. |
| 2007/0271014 | A1 | 11/2007 | Breed |
| 2007/0288271 | A1 | 12/2007 | Klinkhammer |
| 2008/0015748 | A1 | 1/2008 | Nagy |
| 2008/0082221 | A1 | 4/2008 | Nagy |
| 2008/0119983 | A1 | 5/2008 | Inbarajan et al. |
| 2008/0133126 | A1 * | 6/2008 | Dupray ................. G01S 13/878 701/408 |
| 2008/0162166 | A1 * | 7/2008 | Naroian ................. G06Q 30/00 705/26.1 |
| 2008/0195435 | A1 * | 8/2008 | Bentley ............. G06Q 30/0204 705/7.33 |
| 2008/0201232 | A1 * | 8/2008 | Walker ............... G06Q 30/0202 705/14.35 |
| 2008/0252466 | A1 | 10/2008 | Yopp et al. |
| 2008/0255722 | A1 | 10/2008 | McClellan et al. |
| 2008/0255888 | A1 | 10/2008 | Berkobin et al. |
| 2008/0262670 | A1 | 10/2008 | McClellan et al. |
| 2008/0294302 | A1 | 11/2008 | Basir |
| 2008/0306750 | A1 * | 12/2008 | Wunder ............... G06Q 10/10 705/1.1 |
| 2009/0024273 | A1 | 1/2009 | Follmer et al. |
| 2009/0043441 | A1 | 2/2009 | Breed |
| 2009/0051566 | A1 | 2/2009 | Olsen et al. |
| 2009/0063330 | A1 | 3/2009 | Cerise et al. |
| 2009/0102638 | A1 | 4/2009 | Olsen et al. |
| 2009/0109037 | A1 | 4/2009 | Farmer |
| 2009/0271548 | A1 | 10/2009 | McAslan et al. |
| 2010/0010919 | A1 * | 1/2010 | Hudak .................. G06Q 30/06 705/26.1 |
| 2010/0030586 | A1 | 2/2010 | Taylor et al. |
| 2010/0082245 | A1 | 4/2010 | Patenaude et al. |
| 2010/0088163 | A1 | 4/2010 | Davidson et al. |
| 2010/0131303 | A1 * | 5/2010 | Collopy ............. G06Q 30/0251 340/5.82 |
| 2010/0131305 | A1 | 5/2010 | Collopy et al. |
| 2010/0145865 | A1 | 6/2010 | Berger et al. |
| 2010/0235891 | A1 * | 9/2010 | Oglesbee ............. H04W 4/029 707/610 |
| 2010/0238009 | A1 | 9/2010 | Cook et al. |
| 2010/0295707 | A1 | 11/2010 | Bennie et al. |
| 2010/0306138 | A1 * | 12/2010 | Hotes .................... G06Q 30/02 706/54 |
| 2010/0332073 | A1 | 12/2010 | Mathieson et al. |
| 2011/0022530 | A1 * | 1/2011 | Bogle ................... G06Q 10/00 705/321 |
| 2011/0077028 | A1 | 3/2011 | Wilkes, III et al. |
| 2011/0161119 | A1 | 6/2011 | Collins |
| 2011/0172873 | A1 | 7/2011 | Szwabowski et al. |
| 2011/0264323 | A1 | 10/2011 | Sakakibara et al. |
| 2011/0307411 | A1 * | 12/2011 | Bolivar ............... G06F 16/9535 707/E17.084 |
| 2012/0028635 | A1 | 2/2012 | Borg et al. |
| 2012/0083960 | A1 | 4/2012 | Zhu et al. |
| 2012/0109418 | A1 | 5/2012 | Lorber |
| 2012/0116631 | A1 | 5/2012 | Lee et al. |
| 2012/0158436 | A1 | 6/2012 | Bauer et al. |
| 2012/0200490 | A1 | 8/2012 | Inada |
| 2012/0226421 | A1 | 9/2012 | Kote et al. |
| 2012/0265770 | A1 | 10/2012 | Desjardins et al. |
| 2012/0290497 | A1 | 11/2012 | Magara et al. |
| 2012/0316699 | A1 | 12/2012 | Filev et al. |
| 2013/0024060 | A1 | 1/2013 | Sukkarie et al. |
| 2013/0030657 | A1 | 1/2013 | Chatterjee et al. |
| 2013/0076885 | A1 | 3/2013 | Kobetski et al. |
| 2013/0080243 | A1 * | 3/2013 | Dias ........................ G06Q 30/02 705/14.43 |
| 2013/0080249 | A1 * | 3/2013 | Dias ........................ G06Q 30/02 705/14.48 |
| 2013/0117180 | A1 * | 5/2013 | Tedesco .................. G06Q 20/14 705/40 |
| 2013/0124038 | A1 | 5/2013 | Naboulsi |
| 2013/0190967 | A1 | 7/2013 | Hassib et al. |
| 2013/0218427 | A1 | 8/2013 | Mukhopadhyay et al. |
| 2013/0226820 | A1 * | 8/2013 | Sedota, Jr. ......... G06Q 30/0201 705/347 |
| 2013/0275214 | A1 | 10/2013 | Kote et al. |
| 2013/0285855 | A1 * | 10/2013 | Dupray ................. H04W 4/021 342/451 |
| 2013/0302758 | A1 | 11/2013 | Wright |
| 2013/0325541 | A1 | 12/2013 | Capriotti et al. |
| 2013/0332023 | A1 | 12/2013 | Bertosa et al. |
| 2014/0032436 | A1 | 1/2014 | Patel |
| 2014/0067152 | A1 | 3/2014 | Swanson et al. |
| 2014/0089101 | A1 | 3/2014 | Meller |
| 2014/0106732 | A1 | 4/2014 | Silver et al. |
| 2014/0129080 | A1 | 5/2014 | Leibowitz et al. |
| 2014/0142996 | A1 | 5/2014 | Skyer et al. |
| 2014/0195106 | A1 | 7/2014 | Mcquade et al. |
| 2014/0207771 | A1 | 7/2014 | Merg |
| 2014/0229060 | A1 | 8/2014 | MacNeille et al. |
| 2014/0229391 | A1 | 8/2014 | East, III et al. |
| 2014/0257873 | A1 * | 9/2014 | Hayward .................. B60C 1/00 705/4 |
| 2014/0309886 | A1 | 10/2014 | Ricci |
| 2014/0310594 | A1 | 10/2014 | Ricci et al. |
| 2014/0350775 | A1 | 11/2014 | Yagi et al. |
| 2014/0358896 | A1 | 12/2014 | Camacho et al. |
| 2014/0379200 | A1 | 12/2014 | Yagi et al. |
| 2014/0379523 | A1 | 12/2014 | Park |
| 2015/0025917 | A1 | 1/2015 | Stempora |
| 2015/0042477 | A1 | 2/2015 | Kobetski et al. |
| 2015/0057875 | A1 | 2/2015 | McGinnis et al. |
| 2015/0140991 | A1 | 5/2015 | Silver et al. |

(56)  References Cited

U.S. PATENT DOCUMENTS

| | | | |
|---|---|---|---|
| 2015/0187013 A1 | 7/2015 | Adams et al. | |
| 2015/0187019 A1 | 7/2015 | Fernandes et al. | |
| 2015/0235485 A1 | 8/2015 | Nemat-Nasser et al. | |
| 2015/0242944 A1 | 8/2015 | Willard et al. | |
| 2015/0246654 A1 | 9/2015 | Tadic et al. | |
| 2015/0268059 A1 | 9/2015 | Borghesani | |
| 2015/0286994 A1 | 10/2015 | Elder | |
| 2015/0287086 A1 | 10/2015 | Macneille et al. | |
| 2015/0294422 A1 | 10/2015 | Carver et al. | |
| 2015/0339678 A1* | 11/2015 | Hampapur | G06Q 30/02 |
| | | | 705/7.29 |
| 2015/0371153 A1* | 12/2015 | Lohmeier | G06Q 40/08 |
| | | | 705/5 |
| 2016/0001781 A1 | 1/2016 | Fung et al. | |
| 2016/0034944 A1* | 2/2016 | Raab | G06Q 10/083 |
| | | | 705/14.4 |
| 2016/0042576 A1 | 2/2016 | Fischer et al. | |
| 2016/0084661 A1 | 3/2016 | Gautama et al. | |
| 2016/0086391 A1 | 3/2016 | Ricci | |
| 2016/0086397 A1 | 3/2016 | Phillips | |
| 2016/0088147 A1 | 3/2016 | Silver et al. | |
| 2016/0098767 A1* | 4/2016 | Daoud | G06F 16/24575 |
| | | | 705/347 |
| 2016/0104217 A1* | 4/2016 | Du | G06Q 30/0282 |
| | | | 705/347 |
| 2016/0117928 A1 | 4/2016 | Hodges et al. | |
| 2016/0133130 A1 | 5/2016 | Grimm et al. | |
| 2016/0170775 A1* | 6/2016 | Rockwell | G06F 13/4282 |
| | | | 713/100 |
| 2016/0189442 A1 | 6/2016 | Wright | |
| 2016/0198306 A1 | 7/2016 | Miles et al. | |
| 2016/0205238 A1 | 7/2016 | Abramson et al. | |
| 2016/0216130 A1 | 7/2016 | Abramson et al. | |
| 2016/0267406 A1* | 9/2016 | Bodo | G06Q 10/0635 |
| 2016/0275624 A1* | 9/2016 | Biemer | G01C 21/3469 |
| 2016/0328890 A1 | 11/2016 | Keane et al. | |
| 2016/0344705 A1* | 11/2016 | Stumpf | H04L 9/3213 |
| 2016/0357262 A1 | 12/2016 | Ansari | |
| 2016/0358477 A1 | 12/2016 | Ansari | |
| 2016/0371553 A1 | 12/2016 | Farnham, IV et al. | |
| 2016/0371595 A1* | 12/2016 | Naveh | G06F 16/285 |
| 2016/0371783 A1* | 12/2016 | Lohrmann | G06Q 40/08 |
| 2016/0371894 A1* | 12/2016 | Rai | G01C 21/3484 |
| 2017/0021764 A1 | 1/2017 | Adams et al. | |
| 2017/0050476 A1 | 2/2017 | Liu et al. | |
| 2017/0113494 A1 | 4/2017 | Singh et al. | |
| 2017/0144671 A1 | 5/2017 | Memani et al. | |
| 2017/0148037 A1* | 5/2017 | Sengupta | G06Q 30/0206 |
| 2017/0241791 A1 | 8/2017 | Madigan et al. | |
| 2017/0255966 A1* | 9/2017 | Khoury | B60W 40/00 |
| 2017/0262925 A1* | 9/2017 | Rangasamy Kannadasan | |
| | | | G06Q 30/0603 |
| 2017/0297583 A1 | 10/2017 | Osumi et al. | |
| 2017/0300049 A1 | 10/2017 | Sally | |
| 2017/0305349 A1 | 10/2017 | Naboulsi | |
| 2017/0337573 A1 | 11/2017 | Toprak et al. | |
| 2017/0344914 A1* | 11/2017 | Mashiach | G06Q 30/04 |
| 2017/0358013 A1* | 12/2017 | Vierra | G06Q 30/0275 |
| 2017/0364869 A1 | 12/2017 | Tarte et al. | |
| 2017/0365007 A1* | 12/2017 | Huls | H04W 4/40 |
| 2017/0371608 A1 | 12/2017 | Wasserman | |
| 2018/0032324 A1* | 2/2018 | Sarkar | G06F 8/65 |
| 2018/0101775 A1 | 4/2018 | Fish | |
| 2018/0150776 A1 | 5/2018 | Anagnos et al. | |
| 2018/0281784 A1 | 10/2018 | Huang | |
| 2018/0308295 A1 | 10/2018 | Kwak | |
| 2019/0164360 A1 | 5/2019 | Pursifull et al. | |
| 2019/0213556 A1* | 7/2019 | Mondal | G06Q 10/1053 |
| 2019/0213676 A1* | 7/2019 | Seo | G06Q 20/085 |
| 2019/0266648 A1* | 8/2019 | Bleichenbacher | |
| | | | G06Q 30/0621 |
| 2019/0370853 A1* | 12/2019 | Vierra | G06Q 30/0275 |
| 2020/0279286 A1* | 9/2020 | Givol | G06Q 30/0609 |
| 2020/0279335 A1* | 9/2020 | Wasserman | G01C 21/3453 |
| 2020/0293580 A1* | 9/2020 | Franke | G06Q 30/0201 |
| 2020/0364799 A1* | 11/2020 | Crowe | G06Q 40/08 |
| 2020/0372553 A1* | 11/2020 | Krishna | G06Q 30/0282 |
| 2021/0035691 A1* | 2/2021 | Chakraborty | G16H 50/30 |
| 2021/0065271 A1* | 3/2021 | Benkreira | G06V 20/30 |
| 2021/0334324 A1* | 10/2021 | Cuttell | H04L 67/535 |
| 2021/0358030 A1* | 11/2021 | Flowers | G06Q 30/0207 |
| 2021/0375076 A1 | 12/2021 | Scotland et al. | |
| 2021/0390605 A1* | 12/2021 | Chow | G06Q 40/08 |
| 2022/0092893 A1 | 3/2022 | Rosenbaum | |
| 2022/0340148 A1 | 10/2022 | Rosenbaum | |
| 2022/0405782 A1* | 12/2022 | Cuttell | G06F 16/958 |
| 2023/0060300 A1 | 3/2023 | Rosenbaum | |
| 2023/0230134 A1* | 7/2023 | Yee | H02J 3/003 |
| | | | 705/400 |
| 2023/0242125 A1* | 8/2023 | Bischoff | B60W 40/09 |
| | | | 340/439 |
| 2023/0368261 A1* | 11/2023 | Avery | G06Q 30/0635 |
| 2024/0070709 A1* | 2/2024 | Thompson | G06Q 30/0202 |
| 2024/0087012 A1* | 3/2024 | Bien-Aime | G06Q 40/03 |
| 2024/0127357 A1* | 4/2024 | Hanson | G06Q 40/08 |
| 2024/0185188 A1* | 6/2024 | Chan | G06Q 30/0631 |
| 2024/0386467 A1* | 11/2024 | Rajamani | G06N 20/00 |
| 2024/0394735 A1* | 11/2024 | Rajamani | G06Q 30/0202 |
| 2025/0054037 A1* | 2/2025 | Levine | G06Q 30/0613 |
| 2025/0104158 A1* | 3/2025 | Fields | G06Q 40/08 |

FOREIGN PATENT DOCUMENTS

| | | |
|---|---|---|
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2016/028228 A1 | 2/2016 |
| WO | WO-2016/033252 A2 | 3/2016 |
| WO | WO-2017/190595 A1 | 11/2017 |

OTHER PUBLICATIONS

"Peng et al. Usage-Based Insurance System Based on Carrier-Cloud-Client, Jun. 23, 2016, IEEE, entire document" (Year: 2016).

Cloud-Based Driver Monitoring and Vehicle Diagnostic with OBD2 Telematics; Amarasinghe et al., 2015 International Conference on Advances in ICT for Emerging Regions (TCTer): 243-249.

Context-Aware Driver Behavior Detection System in Intelligent Transportation Systems; Al-Sultan et al., IEEE Transactions on Vehicular Technology, vol. 62, No. 9, Nov. 2013.

System to Distribute Geographical Vehicle Service and Repair Information; Apr. 23, 2009; IP.com No. IPCOM000182075D.

Non-Final Office Action in U.S. Appl. No. 15/784,813 dated Feb. 2, 2023.

Final Office Action in U.S. Appl. No. 15/784,813 dated Jul. 27, 2023.

* cited by examiner

*FIG. 2*

Operational Data — 102

- Speed
- Acceleration
- Braking
- Cornering
- ADAS
- Drive mode
- Headlight
- Turn signal
- Windshield wiper

Sensor Data — 104

- Traffic conditions
- Weather conditions
- # of passengers
- Seatbelt
- Tire pressure
- Driver images

Diagnostic Data — 106

- Diagnostic fault codes
- Safety warnings
- Software version

Location Data — 110

- GPS (vehicle)
- GPS (mobile device)

Driver-Provided Data — 112

- Age
- Gender
- Education level
- Profession
- Vehicle model
- Vehicle year
- Vehicle color

Third Party Data — 114

- Driver limitations
- Speed limits
- Recall information
- Police blotter information

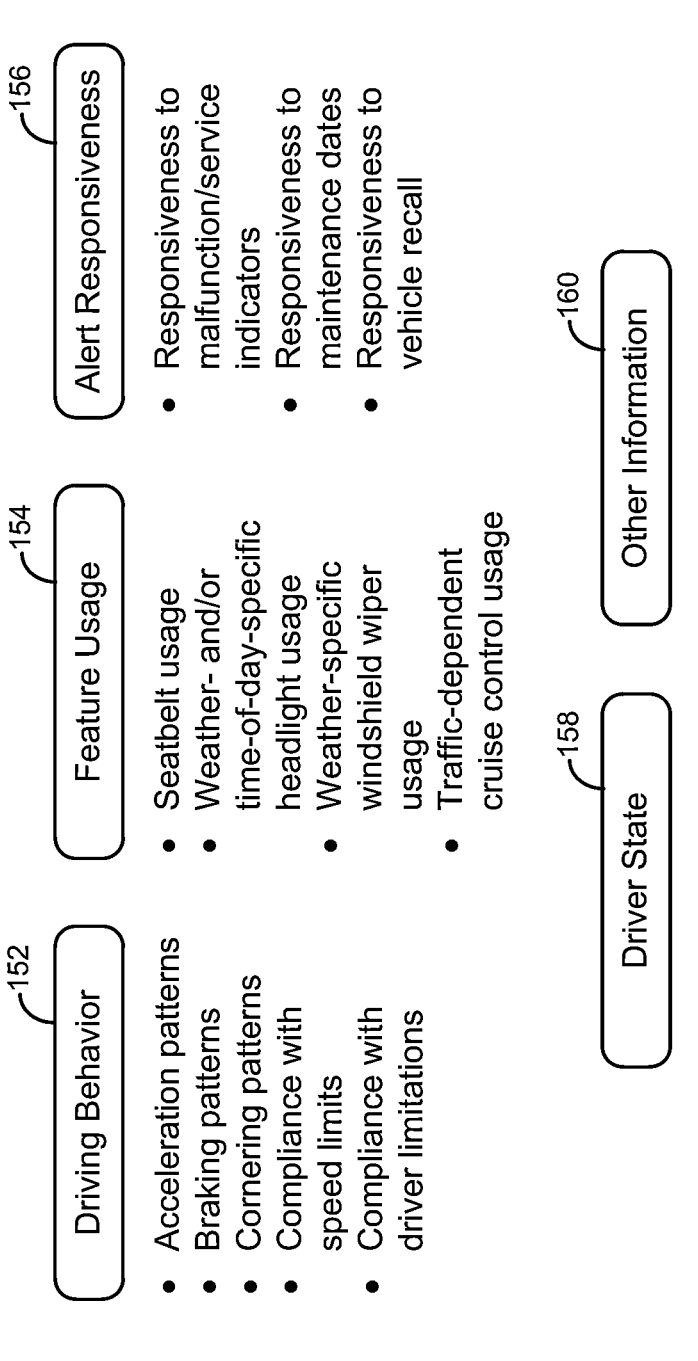

Driving Behavior — 152
- Acceleration patterns
- Braking patterns
- Cornering patterns
- Compliance with speed limits
- Compliance with driver limitations Feature Usage — 154
- Seatbelt usage
- Weather- and/or time-of-day-specific headlight usage
- Weather-specific windshield wiper usage
- Traffic-dependent cruise control usage Alert Responsiveness — 156
- Responsiveness to malfunction/service indicators
- Responsiveness to maintenance dates
- Responsiveness to vehicle recall Driver State — 158
- Driver attentiveness
- Driver emotional state Other Information — 160
- Up-to-date software
- Location-based risk averseness

150

300

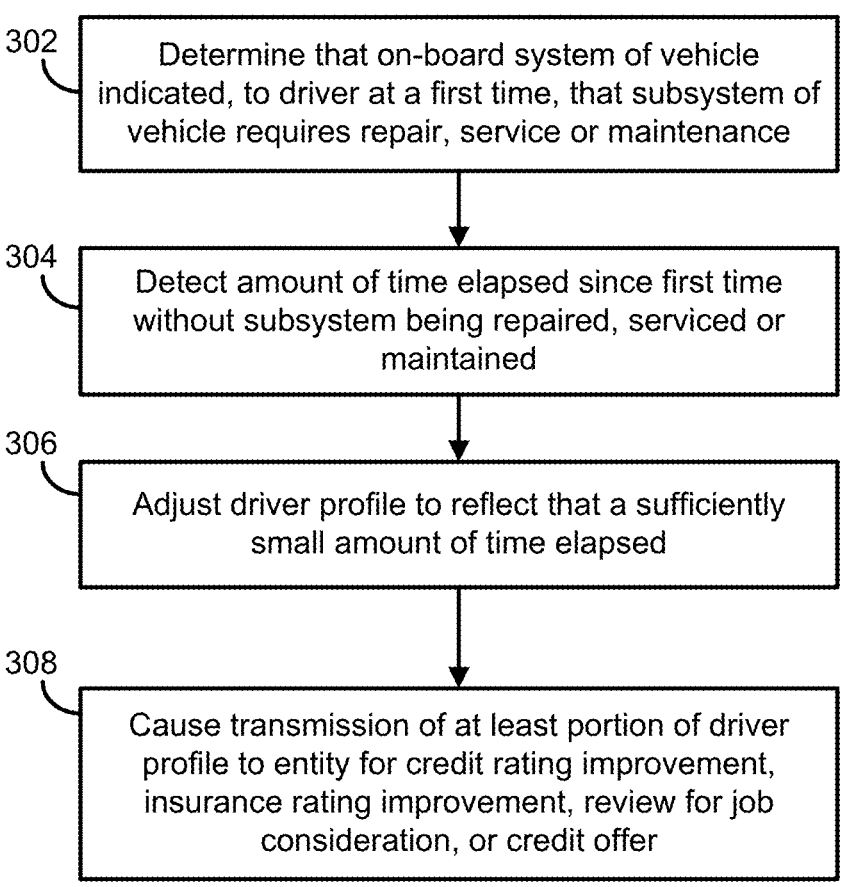

302 — Determine that on-board system of vehicle indicated, to driver at a first time, that subsystem of vehicle requires repair, service or maintenance 304 — Detect amount of time elapsed since first time without subsystem being repaired, serviced or maintained 306 — Adjust driver profile to reflect that a sufficiently small amount of time elapsed 308 — Cause transmission of at least portion of driver profile to entity for credit rating improvement, insurance rating improvement, review for job consideration, or credit offer

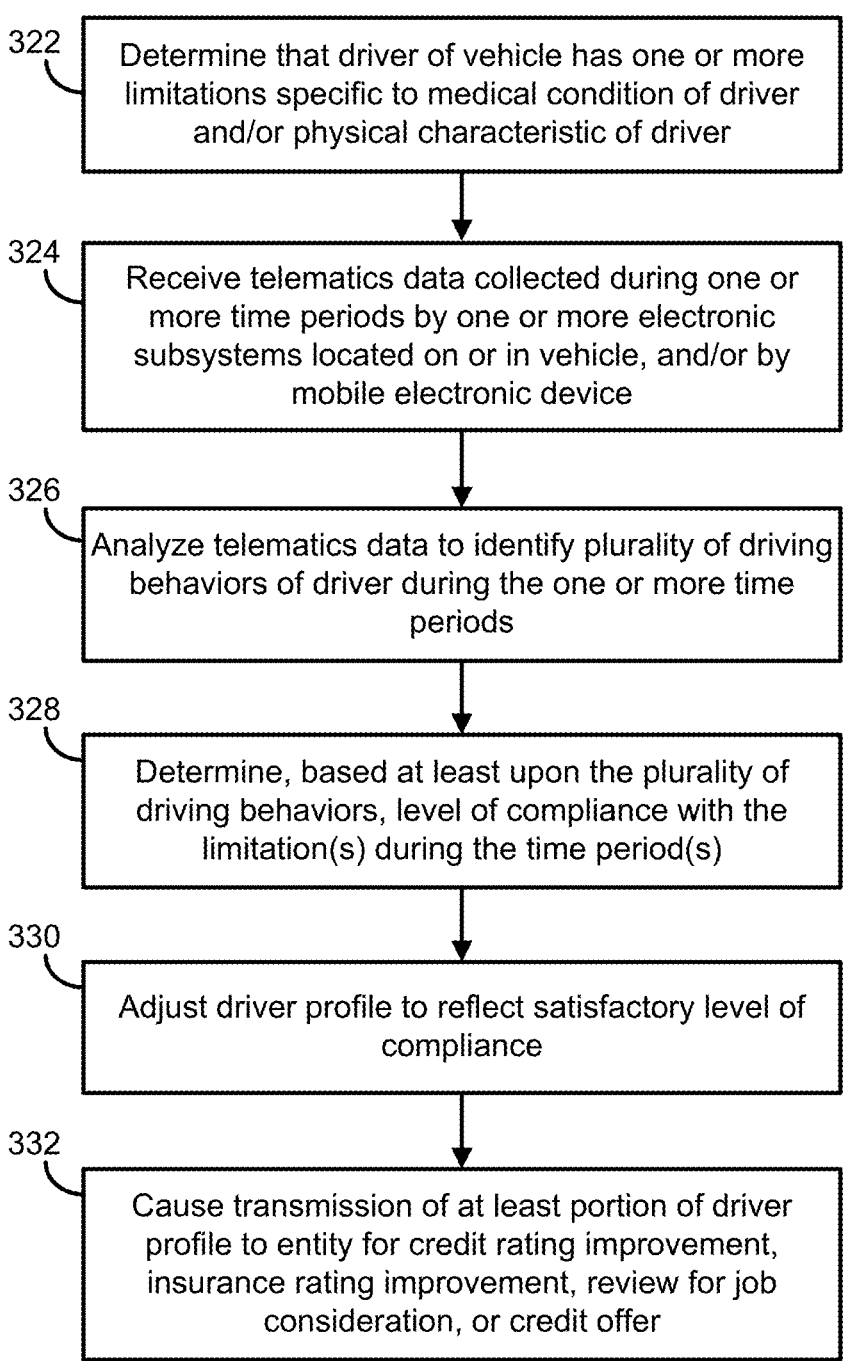

322   Determine that driver of vehicle has one or more limitations specific to medical condition of driver and/or physical characteristic of driver 324   Receive telematics data collected during one or more time periods by one or more electronic subsystems located on or in vehicle, and/or by mobile electronic device 326   Analyze telematics data to identify plurality of driving behaviors of driver during the one or more time periods 328   Determine, based at least upon the plurality of driving behaviors, level of compliance with the limitation(s) during the time period(s)

330   Adjust driver profile to reflect satisfactory level of compliance

332   Cause transmission of at least portion of driver profile to entity for credit rating improvement, insurance rating improvement, review for job consideration, or credit offer

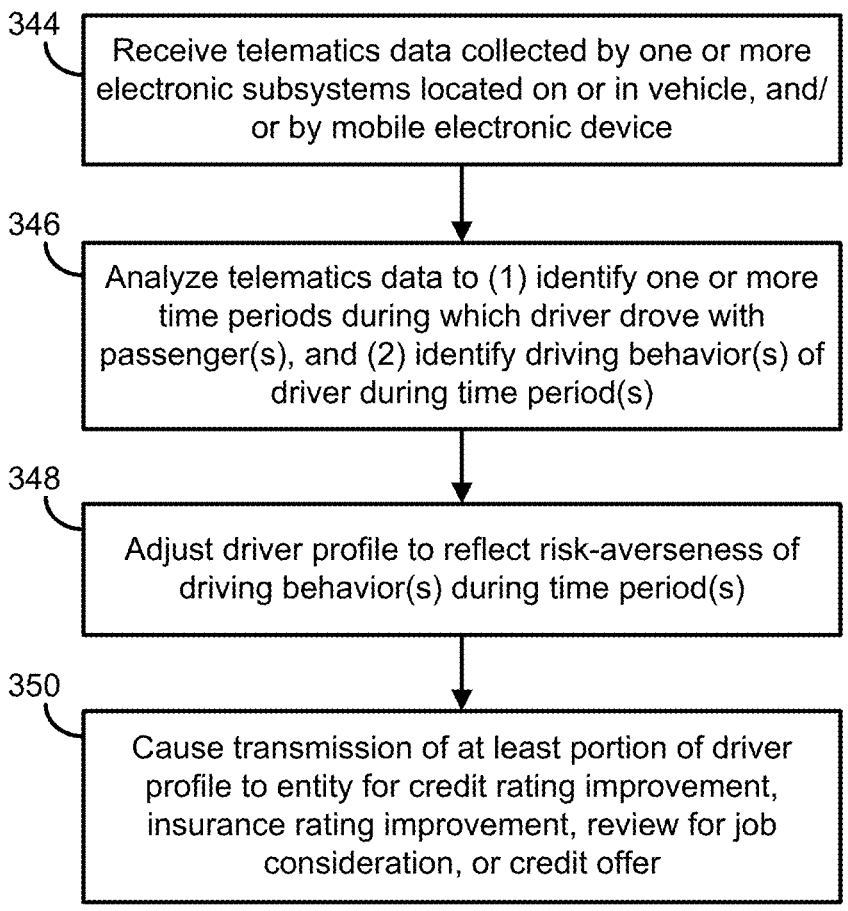

344 — Receive telematics data collected by one or more electronic subsystems located on or in vehicle, and/or by mobile electronic device 346 — Analyze telematics data to (1) identify one or more time periods during which driver drove with passenger(s), and (2) identify driving behavior(s) of driver during time period(s)

348 — Adjust driver profile to reflect risk-averseness of driving behavior(s) during time period(s)

350 — Cause transmission of at least portion of driver profile to entity for credit rating improvement, insurance rating improvement, review for job consideration, or credit offer

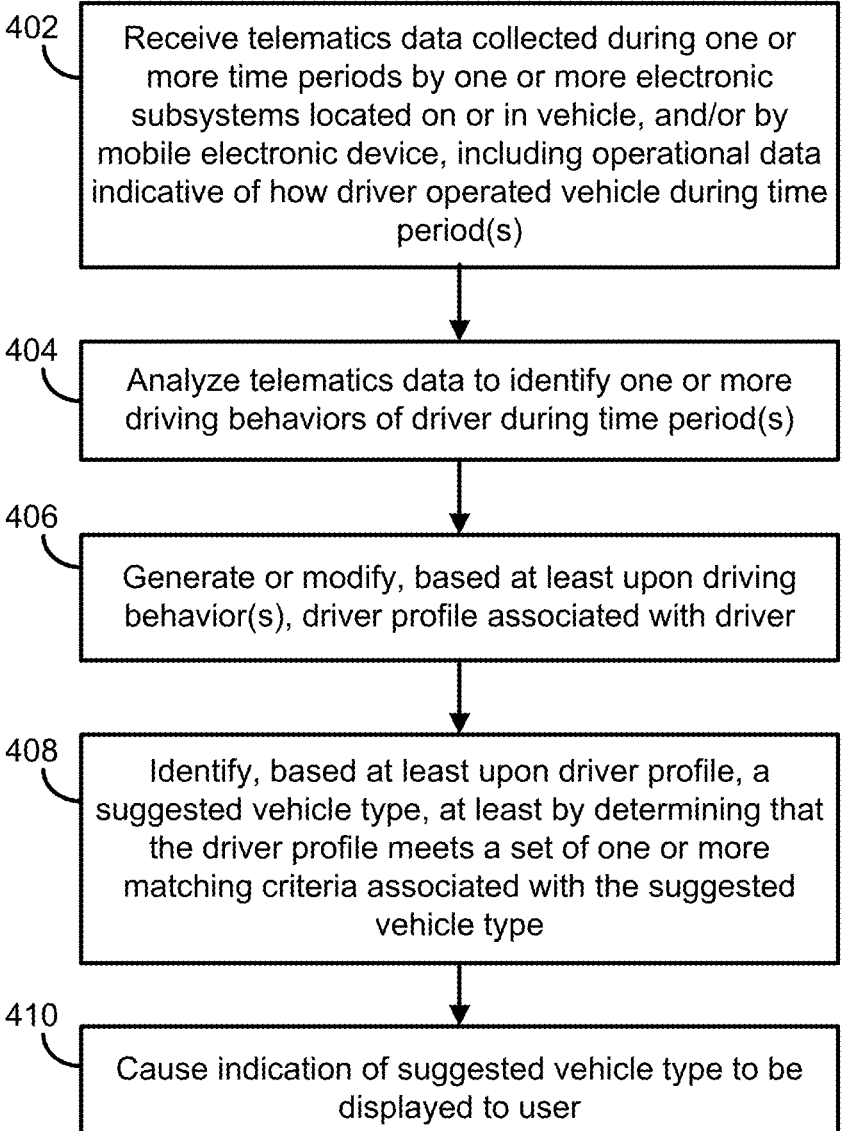

402 Receive telematics data collected during one or more time periods by one or more electronic subsystems located on or in vehicle, and/or by mobile electronic device, including operational data indicative of how driver operated vehicle during time period(s)

404 Analyze telematics data to identify one or more driving behaviors of driver during time period(s)

406 Generate or modify, based at least upon driving behavior(s), driver profile associated with driver 408 Identify, based at least upon driver profile, a suggested vehicle type, at least by determining that the driver profile meets a set of one or more matching criteria associated with the suggested vehicle type 410 Cause indication of suggested vehicle type to be displayed to user

*FIG. 9*

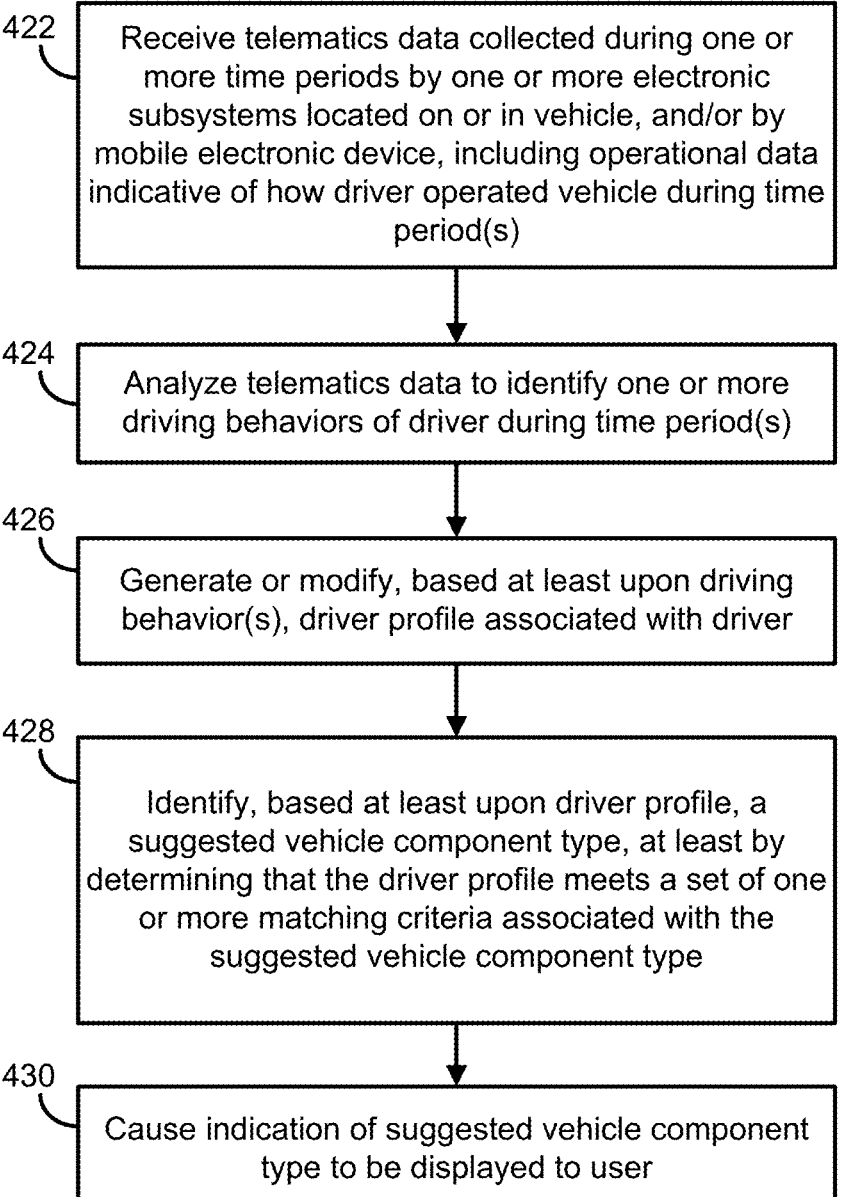

420

422 — Receive telematics data collected during one or more time periods by one or more electronic subsystems located on or in vehicle, and/or by mobile electronic device, including operational data indicative of how driver operated vehicle during time period(s)

424 — Analyze telematics data to identify one or more driving behaviors of driver during time period(s)

426 — Generate or modify, based at least upon driving behavior(s), driver profile associated with driver 428 — Identify, based at least upon driver profile, a suggested vehicle component type, at least by determining that the driver profile meets a set of one or more matching criteria associated with the suggested vehicle component type 430 — Cause indication of suggested vehicle component type to be displayed to user

*FIG. 10*

DRIVER PROFILES BASED UPON RESPONSIVENESS TO VEHICLE ALERTS

CROSS-REFERENCE TO RELATED APPLICATIONS

This is a divisional of U.S. patent application Ser. No. 15/784,813, filed on Oct. 16, 2017, which claims the benefit of U.S. Patent Application No. 62/414,295, filed on Oct. 28, 2016, U.S. Patent Application No. 62/414,291, filed on Oct. 28, 2016, U.S. Patent Application No. 62/524,028, filed on Jun. 23, 2017, U.S. Patent Application No. 62/524,209, filed on Jun. 23, 2017, U.S. Patent Application No. 62/524,208, filed on Jun. 23, 2017, U.S. Patent Application No. 62/524, 212, filed on Jun. 23, 2017, U.S. Patent Application No. 62/524,200, filed on Jun. 23, 2017, U.S. Patent Application No. 62/528,688, filed on Jul. 5, 2017, U.S. Patent Application No. 62/528,689, filed on Jul. 5, 2017, U.S. Patent Application No. 62/528,682, filed on Jul. 5, 2017, U.S. Patent Application No. 62/528,684, filed on Jul. 5, 2017, and U.S. Patent Application No. 62/528,687, filed on Jul. 5, 2017. The disclosure of each of the above-identified references is hereby incorporated herein by reference in its entirety.

FIELD OF THE DISCLOSURE

The present application relates generally to vehicle telematics and, more specifically, to technologies for generating, updating, and/or using driver profiles based upon vehicle telematics and/or other data.

BACKGROUND

The technical field of vehicle telematics has advanced rapidly in recent years, making it possible to learn far more information about driver habits and behaviors than was previously possible. For example, existing technologies may collect and analyze data indicative of a driver's acceleration, braking and cornering habits. By analyzing such data, some of these existing technologies are configured to generate/ output data that may be used to assess driver performance and driver risk. However, existing telematics-based technologies fail to leverage various kinds of information that may be highly probative of a driver's characteristics or qualities, and/or fail to recognize numerous applications in which such information may provide benefits.

BRIEF SUMMARY

In one aspect, a computer-implemented method includes: (1) receiving, by one or more processors of a computer system, software version data generated by an on-board system of a vehicle via a network, wherein the software version data indicates a version of software executed by the on-board system to control operational parameters of the vehicle; (2) determining, by the one or more processors and based at least upon (i) the software version data and (ii) a known current version of the software, whether a latest software update was installed for the on-board system; (3) setting, by the one or more processors and based at least upon whether the latest software update was installed for the on-board system, at least a portion of a driver profile associated with the driver; and/or (4) transmitting, by the one or more processors of the computer system via the network, the at least the portion of the driver profile to a third party server.

In another aspect, a non-transitory, computer-readable medium stores instructions that, when executed by one or more processors, cause the one or more processors to: (1) receive software version data generated by an on-board system of a vehicle via a network, wherein the software version data indicates a version of software executed by the on-board system to control operational parameters of the vehicle; (2) determine, based at least upon (i) the software version data and (ii) a known current version of the software, whether a latest software update was installed for the on-board system; (3) set, based at least upon whether the latest software update was installed for the on-board system, at least a portion of a driver profile associated with the driver; and/or (4) transmit, via the network, at least the portion of the driver profile to a third party server.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 2 depicts exemplary data categories that may be utilized by the computer system of FIG. 1 to generate or modify a driver profile;

FIG. 3 depicts exemplary profile information categories that may be determined by the computer system of FIG. 1 when generating or modifying a driver profile;

FIG. 6 is a flow diagram of an exemplary computer-implemented method for detecting and acting upon driver responsiveness to vehicle alerts;

FIG. 7 is a flow diagram of an exemplary computer-implemented method for detecting and acting upon driver compliance with driver-specific limitations;

FIG. 8 is a flow diagram of an exemplary computer-implemented method for detecting and acting upon driver behavior while driving with passengers;

FIG. 9 is a flow diagram of an exemplary computer-implemented method for identifying a suggested vehicle for a driver;

FIG. 10 is a flow diagram of an exemplary computer-implemented method for identifying a suggested vehicle component for a driver.

The Figures depict aspects of the present invention for purposes of illustration only. One skilled in the art will readily recognize from the following discussion that alternate aspects of the structures and methods illustrated herein may be employed without departing from the principles of the invention described herein.

DETAILED DESCRIPTION

The embodiments described herein relate to, inter alia, systems and techniques for generating, modifying, and/or using profiles for drivers/operators of vehicles. The driver profile may be generated and/or modified using vehicle telematics data indicative of how the operator drives the vehicle (e.g., acceleration data, braking data, etc.), data indicative of when and/or where the operator drives the vehicle (e.g., GPS data), data indicative of the circumstances in which the operator drives the vehicle (e.g., camera or other sensor data indicating the presence of passengers in the vehicle, the distance between the driver's vehicle and other vehicles, weather, etc.), and/or other data (e.g., demographic information, dealership information regarding recalls or maintenance, etc.).

As the term is used herein, "vehicle telematics data" may include any suitable type or types of data provided by the vehicle (e.g., one or more sensors and/or subsystems of the vehicle), by a mobile electronic device carried within the vehicle (e.g., a smartphone or wearable electronic device of the driver), and/or by any other electronic device or component carried on or within the vehicle. Depending upon the context and the embodiment, for example, vehicle telematics data may include acceleration data generated by an electronic control system of the vehicle and/or by an accelerometer of the driver's mobile electronic device, GPS data provided by a GPS unit of the vehicle and/or a GPS unit of the mobile electronic device, image or video data generated by a camera of the vehicle and/or a camera of the mobile electronic device, and so on.

In various different embodiments, the driver profiles may be used in different situations or scenarios. For example, the profiles may be used to adjust insurance ratings (e.g., during initial underwriting, or when renewing a policy, etc.), to rate or showcase a driving instructor or student, to determine whether to provide a discount, and/or for other purposes. In some embodiments, the profile may include a rating that is indicative of the driver's personal responsibility or trustworthiness, and may be used in situations where such qualities are of particular importance. For example, responsibility ratings in driver profiles may be used to adjust driver credit ratings (e.g., when applying for a loan or credit line), to determine whether an "IOU" may be accepted from an individual, to determine whether candidates will be offered particular jobs, and so on.

I. EXEMPLARY COMPUTER SYSTEM FOR GENERATING, MODIFYING, AND/OR USING DRIVER PROFILES

Figure 1:
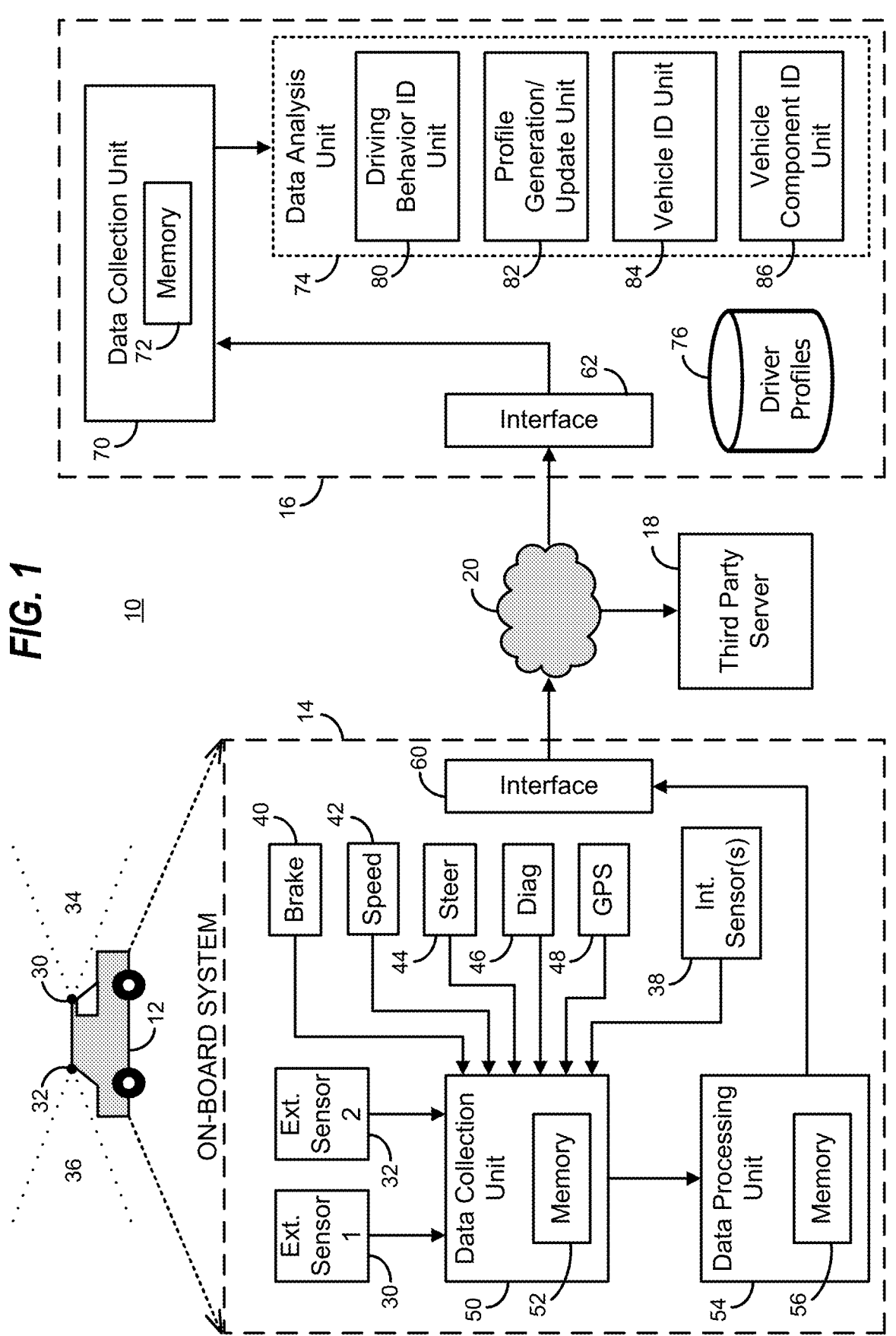
FIG. 1 is a block diagram of an exemplary computer system for generating, modifying, and/or using driver profiles.

FIG. 1 is a block diagram of an exemplary system 10 for generating, modifying, and/or using driver profiles. The system 10 may include a vehicle 12 having an on-board system 14, as well as a computer system 16, a third party server 18, and a network 20. While FIG. 1 depicts vehicle 12 as an automobile, vehicle 12 may instead be a truck, motorcycle, or any other type of land-based vehicle capable of carrying at least one human passenger (including the driver).

Network 20 may be a single wireless network, or may include multiple cooperating and/or independent networks of one or more types (e.g., a cellular telephone network, a wireless local area network (WLAN), the Internet, etc.). On-board system 14 and third party server 18 may both be in communication with the computer system 16 via network 20. While FIG. 1 shows only a single vehicle 12 and a single third party server 18, it is understood that computer system 16 may communicate (e.g., via network 20) with any number of different vehicles (e.g., one or more other vehicles similar to vehicle 12, with on-board systems similar to on-board system 14) and/or any number of different third party servers.

Third party server 18 may be a server of an entity that is not affiliated with either the driver of vehicle 12 or the entity owning, maintaining, and/or using computer system 16, and may be remote from computer system 16 and/or vehicle 12. For example, in various different embodiments discussed further below, third party server 18 may be a server associated with a provider of a mapping service, a provider of a weather information service, an auto repair shop, an auto maker, an auto dealership, an auto parts supplier, an entity that determines credit scores, and so on. As used herein, the term "server" may refer to a single server, or multiple servers working in concert.

On-board system 14 may include a first external sensor 30 and a second external sensor 32, each being configured to sense an environment external to vehicle 12 (i.e., to sense physical characteristics of the environment external to vehicle 12), such as a still image or video camera device, a lidar (laser remote sensing, or light detection and ranging) device, a radar device, or a sonar device, for example. Each of the external sensors 30, 32 may be located on or inside vehicle 12. For example, one or both of the external sensors 30, 32 may be permanently affixed to vehicle 12 (e.g., on the exterior or interior of the frame, on the dashboard, on the inner or outer surface of a windshield, etc.), or may be temporarily affixed to, or simply placed on or in, some portion of the vehicle 12 (e.g., placed on top of the dashboard, or in a device holder affixed to the windshield, etc.).

External sensor 30 and/or external sensor 32 may be included in a general purpose computing device (e.g., as a software application and associated hardware of a smartphone or other portable computer device), or may be a dedicated sensor device. In the example system 10 shown in FIG. 1, external sensor 30 is located on or inside vehicle 12 such that it senses the environment in a forward-facing range 34, while external sensor 32 is located on or inside vehicle 32 such that it senses the environment in a rear-facing range 36. In some embodiments, the external sensor 30 and external sensor 32 may combine to provide a 360 degree sensing range. In other embodiments, however, the external sensor 30 and external sensor 32 may be redundant sensors (of the same type, or of different type) that each provide a 360 degree sensing range. In still other embodiments, external sensor 32 may be omitted, or the on-board system 14 may include more than two external sensors.

Each of external sensors 30, 32 may generate data, or analog information, that is indicative of the sensed external environment. In an embodiment where external sensor 30 is a digital video camera device, for example, external sensor 30 may generate data corresponding to frames of captured digital video. As another example, in an embodiment where external sensor 30 is a digital lidar device, external sensor 30 may generate data corresponding to frames of captured digital lidar information.

On-board system 14 may also include one or more internal sensors 38. In some embodiments, internal sensor(s) 38 may include one or more sensors designed to detect the presence of passengers. For example, internal sensor(s) 38 may include inward-facing digital cameras arranged to capture at least a portion of an interior (cabin) of vehicle 12, and/or one or more seat sensors configured to detect the presence of the driver and/or passengers in the respective seat(s). As another example, internals sensor(s) 14 may instead (or also) include seatbelt sensors that are configured to detect when each seatbelt in vehicle 12 is engaged or not engaged. In embodiments where internal sensor(s) 38 include an inward-facing camera, the camera may be permanently affixed to vehicle 12 (e.g., on the interior of the frame, on the dashboard, on the inner surface of a windshield, etc.), or may be temporarily affixed to, or simply placed on or in, some portion of the vehicle 12 (e.g., placed on top of the dashboard, or in a device holder affixed to the windshield, etc.). Moreover, a camera of internal sensor(s) 38 may be included in a general purpose computing device (e.g., as a software application and associated hardware of a smartphone or other portable computer device), or may be a dedicated sensor device.

On-board system 14 may also include hardware, firmware and/or software subsystems that monitor and/or control various operational parameters of vehicle 12. As seen in FIG. 1, a braking subsystem 40 may generate data indicative of how the brakes of vehicle 12 are applied (e.g., an absolute or relative measure of applied braking force, or a binary indicator of whether the brakes are being applied at all, etc.), a speed subsystem 42 may generate data indicative of how fast the vehicle 12 is being driven (e.g., corresponding to a speedometer reading, an accelerometer measurement, and/or a driver input such as depression of a gas pedal, etc.), and a steering subsystem 44 may generate data indicative of how the vehicle 12 is being steered (e.g., based upon the driver's manipulation of a steering wheel, or based upon automated steering control data, etc.).

A diagnostics subsystem 46 may generate other information pertaining to the operation of vehicle 12, such as warning/alert information to indicate that one or more components of vehicle 12 is/are in need of replacement, an upgrade, and/or servicing. For example, diagnostics subsystem 46 may generate an alert when tire pressure is low (e.g., based upon a signal from a tire pressure sensor not shown in FIG. 1), when the engine is overheating (e.g., based upon a temperature sensor in the engine compartment, also not shown in FIG. 1), when an oil change is recommended, and so on.

The example system 10 may also include a Global Positioning Satellite (GPS) subsystem 48 that generates data indicative of a current location of vehicle 12. In other embodiments, the subsystem 48 uses other positioning techniques instead of GPS, such as cell tower triangulation, for example.

In some embodiments, the braking subsystem 40, speed subsystem 42, steering subsystem 44, diagnostics subsystem 46, and/or one or more different subsystems not shown in FIG. 1 may also generate data indicating whether one or more automated driving systems (e.g., an advanced driver assistance system (ADAS)) is/are currently activated for vehicle 12. For example, the speed subsystem 42 may generate data indicating whether a conventional cruise control system is currently activated, and/or the braking subsystem 40 or steering subsystem 44 may generate data indicating whether assisted steering and/or assisted braking systems are currently activated. As other examples, a unit of on-board system 14 (e.g., diagnostics subsystem 46, or another unit not shown in FIG. 1) may generate data indicating whether vehicle 12 is in an automated transmission mode or a manual transmission mode, or whether the driving of vehicle 12 is currently subject to complete automated/machine control rather than manual (human) control, etc.

In some embodiments, the on-board system 14 may not include one or more of the subsystems 40, 42, 44, 46, 48, one or both of external sensors 30 and 32, and/or internal sensor(s) 38, and/or the on-board system 14 may include additional devices or subsystems not shown in FIG. 1. Moreover, one or more subsystems in on-board system 14 may be included in a general purpose computing device such as a smartphone. For example, the GPS subsystem 48 may include a software application running on a smartphone that includes the appropriate hardware (e.g., an antenna and receiver).

On-board system 14 may also include a data collection unit 50 configured to receive data and/or analog signals from external sensors 30, 32, internal sensor(s) 38, and/or some or all of subsystems 40, 42, 44, 46, 48. The data collection unit 50 may collect the data and/or analog signals substantially in real time, and in any of various different ways, according to different embodiments. In some embodiments, for example, the data collection unit 50 may periodically sample data and/or analog signals from the various external sensors 30, 32, internal sensor(s) 38, and/or subsystems 40, 42, 44, 46, 48, or be notified by the respective sensors or subsystems when new data is available, etc.

In some embodiments, the data collection unit 50 may receive data from one or more of the external sensors 30, 32, internal sensor(s) 38, and/or one or more of subsystems 40, 42, 44, 46, 48 via a wireless link, such as a Bluetooth link. Alternatively, one or more of subsystems 40, 42, 44, 46, 48, internal sensor(s) 38, and/or external sensors 30 and/or 32, may provide data to data collection unit 50 via messages placed on a controller area network (CAN) bus (not shown in FIG. 1) or other suitable bus type, and/or via an on-board diagnostics (OBD) system (also not shown in FIG. 1). For example, the data collection unit 50 may collect information from diagnostics subsystem 46 (and/or from one or more of subsystems 40, 42, 44) via one or more OBD ports. In some embodiments, the data collection unit 50 may collect data using a mix of interface and/or bus types (e.g., a Bluetooth interface to receive data from sensors 30, 32 and internal sensor(s) 38, an OBD port to receive data from diagnostics subsystem 46, and a CAN bus to receive data from subsystems 40, 42, 44).

In some embodiments where one or more of external sensors 30, 32, internal sensor(s) 38, and/or one or more of subsystems 40, 42, 44, 46, 48 generate analog signals, either the respective sensors/subsystems or the data collection unit 50 may convert the analog information to a digital format. Moreover, the data collection unit 50 may convert data received from one or more of external sensors 30, 32, internal sensor(s) 38, and/or one or more of subsystems 40, 42, 44, 46, 48, to different digital formats or protocols. After collecting (and possibly converting) the data from the various sensors/subsystems, the data collection unit 50 may store the data in a memory 52. The memory 52 may be any suitable type of data storage, such as a random access memory (RAM), a flash memory, or a hard drive memory, for example.

On-board system 14 may also include a data processing unit 54 that is coupled to the data collection unit 50. The data processing unit 54 may include one or more processors, or represent software instructions that are executed by one or more processors of on-board system 14, and may be configured to process the data collected by data collection unit 50 and stored in memory 52 for various purposes. In one embodiment, for example, data processing unit 54 simply packages data collected by data collection unit 50 into a format suitable for transmission to computing system 16. Alternatively, or in addition, data processing unit 54 may analyze the collected data to generate various types of information that may be used to update a driver profile, as discussed further below in connection with computing system 16. Data processing unit 54 may include, or be associated with, a memory 56 for storing outputs of the data analysis and/or other processing. Memory 56 may be any suitable type of data storage, such as a RAM, a flash memory, or a hard drive memory, for example. Memory 52 and memory 56 may be separate memories, or parts of a single memory, according to different embodiments.

Data processing unit 54 may be coupled to an interface 60, which may transmit the data received from data processing unit 54 to computer system 16 via network 20. Interface 60 may include a transmitter and one or more antennas, for example. In an alternative embodiment, interface 60 may instead be an interface to a portable memory device, such as a portable hard drive or flash memory device. In this embodiment, the portable memory device may be used to download data from memory 56 of data processing unit 54, and may be manually carried to computer system 16 without utilizing network 20. In another alternative embodiment, a Bluetooth or other short-range link may be used to download data from memory 56 to a portable computer device (e.g., a laptop or smartphone), which may in turn be used to transmit the data to computer system 16 via network 20. In some embodiments, interface 60 may represent multiple types of different interfaces used for different types of data (e.g., a WLAN transceiver for data from external sensors 30, 32, a smartphone cellular transceiver for data from internal sensor(s) 38, and a flash memory device port for data from subsystems 40, 42, 44, 46, 48).

In some embodiments, the data generated by data processing unit 54 and stored in memory 56 may be automatically sent to interface 60 for transmission to computer system 16. For example, the data may be sent to interface 60 at regular time intervals (e.g., once per day, once per hour, etc.). In other embodiments, the data may be sent to computer system 16 in response to a query from computer system 16 that is received via network 20, or in any other suitable manner. Once the data is provided to computer system 16, the data may be subject to further processing (e.g., to generate or modify a profile for the driver of vehicle 12), as discussed further below.

Computer system 16 may be an electronic processing system (e.g., a server) capable of performing various functions, and may include an interface 62 configured to receive data from on-board system 14 of vehicle 12, and data from third party server 18, via network 20. Interface 62 may be similar to interface 60 of on-board system 14, for example. In embodiments where a portable memory device (rather than network 20) is used to transfer at least some of the data from on-board system 14 to computer system 16, interface 62 may include an interface to a portable memory device, such as a portable hard drive or flash memory device, for example.

Computer system 16 may also include a data collection unit 70 coupled to interface 62. Data collection unit 70 may be configured to receive/collect the data received by interface 62, and to store the collected data in a memory 72. Memory 72 may be any suitable type of data storage, such as a RAM, a flash memory, or a hard drive memory, for example. Data collection unit 70 may be coupled to a data analysis unit 74. Data analysis unit 74 may include one or more processors, or represent software instructions that are executed by one or more processors of computing system 16, and may be configured to process the data collected by data collection unit 70 and stored in memory 72 for various purposes according to different embodiments, as discussed further below.

Generally, data analysis unit 74 may analyze data from vehicle 12 (e.g., the data received from on-board system 14 via interface 60) and a number of other vehicles to generate and/or modify/update driver profiles stored in a driver profiles database 76. In the example system 10 of FIG. 1, data analysis unit 74 includes a driving behavior identification unit 80, a profile generation/update unit 82, a vehicle identification unit 84, and a vehicle component identification unit 86. In other embodiments, data analysis unit 74 does not include one or more of units 80, 82, 84, 86, and/or includes additional units not shown in FIG. 1. For example, one or more of units 80, 82, 84, 86 may instead be implemented by data processing unit 54 of on-board system 14 in vehicle 12, or may be entirely absent from system 10. In one embodiment, each of units 80, 82, 84, 86 may include a set of instructions stored on a tangible, non-transitory computer-readable medium and capable of being executed by one or more processors of computer system 10 to perform the functions described below. In another embodiment, each of units 80, 82, 84, and/or 86 includes a set of one or more processors configured to execute instructions stored on a tangible, non-transitory computer-readable medium to perform the functions described below.

Driving behavior identification unit 80 may be generally configured to analyze data received from vehicle 12 (e.g., from interface 60 of on-board system 14, as discussed above) to detect and/or identify various types of driving behaviors. For example, driving behavior identification unit 80 may analyze data generated by subsystems 40, 42, and/or 44 to determine acceleration, braking, and/or cornering patterns of the driver of vehicle 12. As another example, driving behavior identification unit 80 may analyze data generated by external sensor 34 to determine an average (and/or a minimum, etc.) tailgating distance between vehicle 12 and other vehicles in front of vehicle 12, and/or to determine proper/improper lane usage, etc. Other example driving behaviors that may be identified are discussed below in connection with FIG. 3.

In some embodiments, each of one or more driving behaviors identified by driving behavior identification unit 80 may be associated with tags or other metadata indicating the circumstances in which the driving behavior occurred. For example, driving behavior identification unit 80 may determine a first set of acceleration, braking, and/or cornering patterns and tag that set as being associated with times when the driver of vehicle 12 was accompanied by one or more passengers, and determine a second set of acceleration, braking, and/or cornering patterns and tag that set as being associated with times when the driver of vehicle 12 was not accompanied by any passengers. Driving behavior identification unit 80 may determine which sets correspond to the presence of one or more passengers using data generated by internal sensor(s) 38, for example.

As another example, driving behavior identification unit 80 may determine a first average tailgating distance and tag that distance as being associated with times when vehicle 12 was driven on wet or icy roads, determine a second average tailgating distance and tag that distance as being associated with times when vehicle 12 was driven on wet roads, and determine a third average tailgating distance and tag that distance as being associated with times when vehicle 12 was driven on dry roads. Driving behavior identification unit 80 may determine which distances correspond to the presence of icy, wet, or dry roads using data generated by external sensors 30 and/or 32, and/or data from a weather information service (e.g., in an embodiment where third party server 18 or another server not shown in FIG. 1 is associated with the weather information service), for example.

In alternative embodiments, data processing unit 54 may identify some or all of the driving behaviors. In such embodiments, driving behavior identification unit 80 may be excluded from data analysis unit 74, or may operate in conjunction with data processing unit 54. For example, data processing unit 54 may identify some types of driving behaviors, while driving behavior identification unit 80 identifies other types of driving behaviors and/or higher-level driving behaviors. In one such embodiment, for instance, data processing unit 54 may determine tailgating distances to other vehicles using data from external sensor 30 and image recognition algorithms (e.g., to identify an object ahead of vehicle 12 as another vehicle), and driving behavior identification unit 80 may use that information, along with data from third party server 18 or another server, to determine an average tailgating distance for each of a number of different weather conditions (e.g., sunny, partly cloudy, cloudy, fog, rain, snow, icy roads, etc.).

While not shown in FIG. 1, data analysis unit 74 may also include additional units that determine behaviors not directly related to the driver's driving performance. For example, data analysis unit 74 may also include a unit that determines how and when a driver uses particular features (e.g., cruise control, windshield wipers, headlights, etc.), and/or a unit that determines how responsive a driver is to alerts that are provided by on-board system 14, etc.

Profile generation/update unit 82 may be generally configured to use the driving behaviors identified by driving behavior identification unit 80, and possibly also information identified by other units of data analysis unit 74 (e.g., feature usage patterns, etc.), to populate and/or update fields of a driver profile for the driver of vehicle 12 in driver profiles database 76. Each of a number of different drivers (including the driver of vehicle 12) may be associated with a different profile in driver profiles database 76, with each profile having one or more fields of information.

Each driver profile may, in some embodiments, include a "responsibility rating" that indicates how responsible or trustworthy the driver may be (e.g., as determined based upon various driving behaviors and/or other types of information that are probative of responsibility/trustworthiness). In some embodiments, each profile also includes a number of fields indicative of demographic and/or personal information (e.g., gender, age, education level, profession, disabilities/impairments/limitations, etc.), vehicle information (e.g., vehicle model, year, and/or color), and/or other information. Driver profiles database 76 may be stored in memory 72 or a similar memory, for example, or may be external to computer system 16.

Vehicle identification unit 84 may be generally configured to identify particular vehicles that may be most appropriate for individuals based upon the driving behaviors of those individuals, as identified by driving behavior identification unit 80 and reflected in the driver profile as generated or modified by profile generation/update unit 82. Vehicle identification unit 84 may also base the identification of vehicles upon other information in the driver profile, such as demographic information about each driver (e.g., age), each driver's responsibility rating, and/or other profile information. Some more specific examples of the operation of vehicle identification unit 84 are provided below in connection with FIG. 4.

When vehicle identification unit 84 identifies one or more vehicles (e.g., vehicle makes, models, and/or years) that may be particularly well-suited for an individual, computer system 16 may cause an indication of the identified vehicle(s) to be displayed to a user. For example, computer 16 may cause a monitor (not shown in FIG. 1) of computer system 16 to display the indication within a user interface presented by a particular software application. As another example, computing device 16 may send data indicative of the identified vehicle(s) to a third party computing system (e.g., a computing system of an auto dealership). As yet another example, computing device 16 may send data indicative of the identified vehicle(s) to an email address (and/or telephone number for an SMS message) of the driver.

Vehicle component identification unit 86 may be generally configured to identify particular vehicle components that may be most appropriate for individuals based upon the driving behaviors of those individuals, as identified by driving behavior identification unit 80 and reflected in the driver profile as generated or modified by profile generation/update unit 82. As used herein, the term "vehicle component" may refer to a part that is physically fixed to the vehicle, such as a tire or brake pad, or something that is not physically fixed to the vehicle but is used to facilitate vehicle operation, such as oil, brake fluid, or gas. Vehicle component identification unit 86 may also base the identification of vehicle components upon other information in the driver profile, such as demographic information about each driver (e.g., age), each driver's responsibility rating, etc. Some more specific examples of the operation of vehicle component identification unit 86 are provided below in connection with FIG. 5.

When vehicle component identification unit 86 identifies one or more components (e.g., by part number, or type and brand, etc.) that may be particularly well-suited for an individual, computer system 16 may cause an indication of the identified vehicle component(s) to be displayed to a user. For example, computer 16 may cause a monitor (not shown in FIG. 1) of computer system 16 to display the indication within a user interface presented by a particular software application. As another example, computing device 16 may send data indicative of the identified vehicle component(s) to a third party computing system (e.g., a computing system of an auto dealership). As yet another example, computing device 16 may send data indicative of the identified vehicle(s) to an email address (and/or telephone number for an SMS message) of the driver.

While FIG. 1 depicts an embodiment in which vehicle telematics data may be generated and transmitted to computer 16 by an on-board system 14, in other embodiments some or all of the vehicle telematics data may instead be generated and/or transmitted to computer 16 by a mobile electronic device (e.g., a smartphone, a wearable electronic device, and/or another mobile electronic device of the driver and/or a passenger of vehicle 12). For example, an accelerometer, gyroscope, compass, and/or camera of the driver's smartphone may be used to generate vehicle telematics data, which may be transmitted to computer 16 by either the smartphone itself or on-board system 14 (e.g., after the smartphone transmits the telematics data to on-board system 14 via a short-range communication technology such as WiFi or Bluetooth). In embodiments where the driver's or passenger's mobile electronic device transmits some or all of the vehicle telematics data to computer 16, the mobile electronic device may include an interface (e.g., similar to interface 60) that is configured to transmit the data to computer 16 via network 20 or another network.

II. EXEMPLARY INPUTS FOR GENERATING OR MODIFYING DRIVER PROFILES

FIG. 2 depicts exemplary data categories 100 that may be utilized by the system 10 of FIG. 1 to generate or modify a driver profile, such as a driver profile included in driver profiles database 76 of computer system 16. The data categories 100 may include operational data 102, sensor data 104, diagnostic data 106, location data 110, driver-provided data 112, and/or third party data 114. In other embodiments, the data categories 100 may include more, fewer, and/or different categories of data, and/or each category shown in FIG. 2 may include more, fewer, and/or different types of data.

Operational data 102 may include one or more types of data relating to operation of a vehicle, such as speed data, acceleration data, braking data, cornering data, ADAS data (e.g., whether/when ADAS is engaged), drive mode data (e.g., data indicating whether the driver selected a "comfort," "eco" or "sport" mode), headlight data (e.g., whether/when headlights are turned on), turn signal data (e.g., whether/when turn signals are used), and/or windshield wiper data (e.g., whether/when front and/or rear wipers are used). Some or all of operational data 102 may be data generated by subsystems 40, 42, 42, and/or 46 of FIG. 1, one or more other subsystems of vehicle 12 not shown in FIG. 1, and/or a mobile electronic device of a driver or passenger.

Sensor data 104, which may overlap in definition with operational data 102 to some degree, may include one or more types of data indicative of internal and external conditions of a vehicle, and particularly conditions that may be captured by cameras, weight sensors, and/or other types of sensors. Sensor data 104 may include, for example, traffic condition data, weather condition data, data indicating the number of passengers in the vehicle, data indicating when particular seatbelts are used, data indicative of tire pressure, and/or driver image data. Some or all of sensor data 102 may be data generated by external sensor 30, external sensor 32, and/or internal sensor(s) 38 of FIG. 1, and/or by a mobile electronic device of a driver or passenger. For example, external sensor 30 and/or external sensor 32 may generate the traffic and/or weather data, internal sensor(s) 38 may generate the data indicative of number of passengers, seatbelt usage data, and/or driver image data, and a different sensor of vehicle 12 (not shown in FIG. 1) may generate the tire pressure data.

Diagnostic data 106 may include one or more types of data indicative of the state of hardware and/or software systems of a vehicle, such as data indicative of diagnostic fault codes, data indicative of safety warnings or alerts (e.g., a check engine alert, a low tire pressure warning, an oil change reminder, etc.), and/or data indicative of the current version of one or more units of software installed in the vehicle (e.g., for on-board system 14 of FIG. 1). Some or all of diagnostic data 106 may be data generated by diagnostic subsystem 46 of FIG. 1, for example.

Location data 110 may include one or more types of data indicative of vehicle location. For example, location data 110 may include location data obtained from a GPS unit installed in a vehicle (e.g., GPS subsystem 48 of FIG. 1), and/or location data obtained from a mobile device (e.g., smartphone, smart watch, etc.) of the driver that includes a GPS unit.

Driver-provided data 112 may include one or more types of data indicative of a driver and his or her vehicle, such as driver age, driver gender, driver education level, driver profession, vehicle model, vehicle year, and/or vehicle color. As the label suggests, driver-provided data 112 may be data that the driver provided (e.g., when filling out an application or other form or questionnaire). Alternatively, some or all of driver-provider data 112 may be obtained in a different manner (e.g., provided by a third party, similar to third party data 114).

Third party data 114 may include one or more types of data sourced by one or more third party entities. For example, third party data 114 may include data indicative of specific driver limitations (e.g., vision impairment, motor skill impairment, etc.), which may be obtained from a governmental or other entity. As another example, third party data 114 may include data indicative of speed limits, which may be obtained from a governmental entity, an entity that provides a mapping service, or another entity. As yet another example, third party data 114 may include data indicative of recall information (e.g., types and dates of recalls, dates of recall notices being sent, whether particular vehicles were serviced to address a recall, etc.), which may be obtained from a vehicle manufacturer or other entity. As still another example, third party data 114 may include police blotter information (e.g., locations and types of crimes and other offenses), which may be obtained from a governmental or other entity.

As noted above, the data in the exemplary data categories 100 may be analyzed by the system 10 of FIG. 1 to generate or modify a driver profile, such as a driver profile included in driver profiles database 76 of computer system 16. Various examples of how data shown in FIG. 2 may be used to determine/set profile information are provided below in connection with FIG. 3.

III. EXEMPLARY INFORMATION DETERMINED FOR DRIVER PROFILES

FIG. 3 depicts exemplary profile information categories 150 that may be determined by the system 10 of FIG. 1 (e.g., by data analysis unit 74) when generating or modifying a driver profile, such as a driver profile included in driver profiles database 76 of computer system 16. The profile information categories 150 may include driving behavior information 152, feature usage information 154, alert responsiveness information 156, driver state information 158, and/or other information 160. In other embodiments, the profile information categories 150 may include more, fewer, and/or different categories than are shown in FIG. 3, and/or each category may include more, fewer, and/or different types of information than are shown in FIG. 3.

Driving behavior information 152 may include acceleration patterns, braking patterns, cornering patterns, compliance with speed limits, and/or compliance with driver limitations. For example, driving behaviors identification unit 80 or another unit of data analysis unit 74 may determine acceleration, braking, and cornering patterns (e.g., an average and standard deviation of the time to accelerate from 0 to 30 miles per hour, an average and standard deviation of the time to go from 60 miles per hour to a complete stop, a metric relating speed to turn radius, and so on) using acceleration, braking, and cornering data from operational data 102 of FIG. 2.

As another example, driving behaviors identification unit 80 or another unit of data analysis unit 74 may determine compliance with speed limits (e.g., a number of times in a particular time period that the posted speed limit is exceeded by more than 5 miles per hour, a maximum amount or percentage by which a posted speed limit is exceeded in a particular time period, etc.) using speed data from operational data 102 (or using acceleration data of operational data 102 to determine speed), and speed limit data from third party data 114, of FIG. 2.

As yet another example, driving behaviors identification unit 80 or another unit of data analysis unit 74 may determine compliance with driver-specific limitations using one or more types of data within operational data 102 of FIG. 2, one or more types of data within sensor data 104 of FIG. 2, and driver limitation data from third party data 114 of FIG. 2. For example, driving behaviors identification unit 80 or another unit of data analysis unit 74 may use data from external sensor 30 and speed subsystem 42 of FIG. 1 to determine one or more metrics indicating how closely a driver follows other vehicles ("tailgates") in relation to his or her speed. Further, driving behaviors identification unit 80 or another unit of data analysis unit 74 may determine from the third party server 18 of FIG. 1 (e.g., a department of transportation within a state) or from the driver that he or she has a particular level of vision impairment (e.g., shortsightedness or poor night vision), motor skill impairment (e.g., due to a handicap or injury), and/or other medical conditions and/or physical characteristics that may limit how he or she can safely operate a vehicle. Thereafter, driving behaviors identification unit 80 may determine whether the driver tends to follow other vehicles at a "safe" distance, in light of known correlations between drivers with similar limitations and the occurrence of accidents. Other driving behaviors (e.g., braking patterns, cornering patterns, windshield wiper usage, etc.) may also, or instead, be analyzed in connection with any driver-specific limitations.

In some implementations, one or more of the types of information in driving behavior information 152 may be further subdivided based upon conditions at the time of the behavior. For example, some or all of the driving behavior information 152 may be associated with different weather conditions, different traffic conditions, different times and/or lighting conditions (e.g., day, evening, night, etc.), different vehicle models (e.g., if profile information is separately determined for multiple vehicles of a driver), different types of roads/areas, and so on. Thus, for instance, driving behavior information 152 may include compliance with speed limits (e.g., an indication of how often and/or long the driver exceeds the speed limit by a predetermined threshold amount) for heavy traffic, and also compliance with speed limits for light and/or moderate traffic. As another example, driving behavior information 152 may include compliance with speed limits in school zones, as well as compliance with speed limits on interstate roads. As yet another example, driving behavior information 152 may include acceleration, braking, and cornering patterns in clear weather, as well as similar patterns in rainy, foggy, and/or snowy/icy weather.

Feature usage information 154 may include seatbelt usage, weather- and/or time-of-day-specific headlight usage, weather-specific windshield wiper usage, and/or traffic-dependent cruise control usage. For example, driving behaviors identification unit 80 or another unit of data analysis unit 74 may use seatbelt data from sensor data 104 of FIG. 2 to determine how often a seatbelt is used for the driver (and/or one or more passengers). As another example, driving behaviors identification unit 80 or another unit of data analysis unit 74 may use headlight data from operational data 102 and weather condition data from sensor data 104 and/or third party data 114 to determine how often (and/or for how long) the driver uses vehicle headlights when driving at night, in foggy weather, and/or when raining.

As yet another example, driving behaviors identification unit 80 or another unit of data analysis unit 74 may use windshield wiper data from operational data 102 and weather condition data from sensor data 104 and/or third party data 114 to determine how often (and/or for how long) the driver uses windshield wipers when it is raining heavily and/or lightly. As still another example, driving behaviors identification unit 80 or another unit of data analysis unit 74 may use ADAS or other data from operational data 102 and traffic condition data from sensor data 104 and/or third party data 114 to determine how often (and/or for how long) the driver uses cruise control in various different degrees of traffic.

Alert responsiveness information 156 may include responsiveness to malfunction/service indicators (e.g., a check engine light, a low tire pressure warning, an oil change reminder light, a faulty sensor indicator, etc.), responsiveness to maintenance dates (e.g., whether the driver has his or her vehicle serviced partially or wholly in accordance with maintenance recommendations, such as those in a user's manual), and/or responsiveness to vehicle recall notices (e.g., for a defective air bag, etc.). For example, driving behaviors identification unit 80 or another unit of data analysis unit 74 may determine an amount of time between a malfunction/service indicator being activated on a dashboard of vehicle 12 and the driver (or another individual) either correcting the problem (e.g., by filling low tires with air) or having the vehicle serviced to correct the problem (e.g., taking the vehicle to a repair shop or dealer to address a check engine light issue).

The determination may be made using data such as diagnostic fault code and/or safety warning data of diagnostic data 106 in FIG. 2 (e.g., to determine when an alert was first triggered, and possibly also to determine when the problem was resolved), and possibly data from a third party such as data from third party server 18 of FIG. 1 (e.g., if third party server 18 is associated with a dealer that services the vehicle), for example. Driving behaviors identification unit 80 or another unit of data analysis unit 74 may also determine other information, such as whether a predetermined threshold amount of time has been exceeded (e.g., three months since an alert was first triggered), and/or how often certain safety warnings (e.g., dynamic stability control warnings, anti-lock braking system warnings, etc.) are triggered.

As another example, driving behaviors identification unit 80 or another unit of data analysis unit 74 may determine a difference in time between a maintenance service being performed on a vehicle (e.g., oil change, rotation and/or balancing of tires, belt checks, filter checks, etc.) and the suggested date for that service being performed (or a date corresponding to a suggested mileage). The determination may be made using known, suggested maintenance dates and/or mileages, and data such as an odometer reading (e.g., provided by on-board system 14 of FIG. 1) and data indicative that a service was performed (e.g., from diagnostic data 106 or third party data 114 of FIG. 2, and/or from the driver or another individual who uses a computing device to send a message indicating that he or she performed the service, etc.), for example.

As yet another example, driving behaviors identification unit 80 or another unit of data analysis unit 74 may determine a difference in time between (1) a recall notice being sent to the driver for a specific vehicle (e.g., via physical mail, via email, via SMS text message, and/or via a dedicated software application executing on a computing device of the driver) and (2) the driver or another individual taking the vehicle in for servicing related to the recall notice. The determination may be made using recall communication information, as well as service data (e.g., date and type of a service that addresses the recall), from third party data 114, for example.

Driver state information 158 may include driver attentiveness and/or driver emotional state. For example, driving behaviors identification unit 80 or another unit of data analysis unit 74 may determine how attentive a driver is (e.g., gaze direction, how often he or she checks instruments and/or the rearview mirror, etc.) by using image recognition and/or other image processing techniques to process driver image data from sensor data 104 of FIG. 2. As another example, driving behaviors identification unit 80 or another unit of data analysis unit 74 may determine a driver's emotional state and/or level of attentiveness (e.g., calm, angry, distracted, etc.) by using image recognition and/or other image processing techniques to process driver image data from sensor data 104.

Other information 160 may include whether vehicle software (e.g., software executed by on-board system 14 of FIG. 1 to control some or all of the operation of on-board system 14) is up-to-date, and/or location-based risk averseness (e.g., whether the driver tends to avoid areas with higher crime rates). For example, driving behaviors identification unit 80 or another unit of data analysis unit 74 may determine whether a driver has had his or her vehicle serviced to install a latest software version/update using software version data from diagnostic data 106 of FIG. 2, and also using a known, current software version. As another example, driving behaviors identification unit 80 or another unit of data analysis unit 74 may determine how often, how long, and/or at what times of day a driver drives in relatively high-crime areas using vehicle and/or mobile device GPS data from location data 110, and/or police blotter information from third party data 114.

Some or all of the types of profile information discussed above, and/or other types of information, may be used (e.g., by profile generation/update unit 82 of FIG. 1) to populate and/or update one or more profile fields for a particular driver. For example, profile generation/update unit 82 may use some types of profile information within driving behavior information 152 and/or alert responsiveness information 156 as profile field values, and also calculate a "responsibility rating" based upon driving behavior information 152, feature usage information 154, alert responsiveness information 156, driver state information 158, and/or other information 160. When calculating a responsibility rating, various profile information types and/or categories may be more heavily weighted than others. For example, compliance with speed limits may be weighted more heavily than responsiveness to malfunction/service indicators, and responsiveness to malfunction/service indicators may be weighted more heavily than weather-specific windshield wiper usage, etc. Generally, specific types of profile information may be used to determine the responsibility rating if it is known a priori (e.g., from past correlations with driver actions) or believed that those types of information are probative of how trustworthy or responsible the driver is.

The responsibility rating, and/or other fields of the driver profile, may also be affected by other types of profile information, including types of information not shown in FIG. 2. For example, the responsibility rating may be determined using various types of information shown in FIG. 3, and also using information about the driver and/or vehicle (e.g., data included in driver-provided data 112 of FIG. 2, such as age, gender, education level, profession, vehicle model, etc.). As just one more specific example, the responsibility rating (or other information in a driver profile)

may be based at least in part upon a joint consideration of (1) a color of the vehicle, (2) times of day when the vehicle is driven, and (3) weather in which the vehicle is driven (e.g., in view of the assumption or known correlation that vehicles of certain colors may be less visible at certain times of day and/or in certain types of weather).

IV. EXEMPLARY USE CASES FOR DRIVER PROFILES

Once a driver profile is determined (e.g., generated or updated using some or all of the profile information shown in FIG. 3, and/or other types of information), one or more fields of the profile may be used in any of a number of different ways, depending upon the embodiment. Two use cases, relating to the identification of suggested vehicles or vehicle components, have already been discussed above in connection with vehicle identification unit 84 and vehicle component identification unit 86 of FIG. 1.

In other embodiments, the driver profile may be used in connection with driver education and/or licensing. For example, situation-specific driving behaviors reflected in the profile (e.g., driving behavior in specific types of weather and/or traffic) may be used by a government entity for licensing or re-licensing of drivers. As another example, driver profiles may be used to rate how well or responsibly a driving instructor drives, and/or how well or responsibly his or her students drive (with the latter ratings potentially also being used to rate the instructor). In embodiments such as these, driver profile information may be transmitted to a remote computing system (e.g., third party server 18 of FIG. 1) for display to one or more individuals positioned to act upon the information (e.g., to approve the grant of a license, or provide a performance review to an instructor, etc.).

In still other embodiments, driver profiles may be used to adjust costs for usage-based insurance and/or other insurance premiums. For example, an underwriting department of an insurer may use driver profile information to gauge risk and set appropriate premiums. Alternatively, the costs of usage-based insurance may be automatically calculated by a computing system (e.g., computer system 16 of FIG. 1) based upon the driver profile information.

In still other embodiments, driver profiles may be used to influence resale values of vehicles. In particular, driver profile information indicative of how aggressively or conservatively the driver drove the vehicle may cause the value to go down or up, respectively. In embodiments such as these, driver profile information may be transmitted to a remote computing system (e.g., third party server 18 of FIG. 1, or a personal computing device of a potential buyer, etc.) for display to one or more individuals positioned to act upon the information (e.g., set the vehicle resale price, or buy the vehicle).

In still other embodiments, driver profiles may be used by fleet owners to provide rental vehicle discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a rental fee.

In still other embodiments, driver profiles may be used by car sharing services to provide discounts. For example, driver profile information may be transmitted to a remote computing system (e.g., third party server 18 of FIG. 1) for display to one or more individuals positioned to act upon the information (e.g., an agent who can apply the discount), or to cause the discount to be automatically applied to a car share fee.

In still other embodiments, driver profiles may be used for other purposes, such as determining how a particular individual would likely care for or maintain an autonomous vehicle, estimating how long vehicle components (e.g., tires, brake pads, rotors, etc.) will last, and so on.

In some embodiments where driver profiles include responsibility ratings (as discussed above), such ratings may be used in a number of different situations where the driver's trustworthiness is important. For example, the responsibility rating may be used by a credit rating entity to raise or lower the driver's credit score. In embodiments such as these, driver responsibility ratings may be transmitted to a remote computing system (e.g., third party server 18 of FIG. 1) for display to one or more individuals positioned to act upon the information (e.g., authorize a credit score change), and/or for automated adjustment of the credit score.

As another example, the responsibility rating may be submitted to an employer in connection with a resume and/or application for a particular job. A responsibility rating may be especially pertinent to jobs that involve frequent driving, such as a driver for restaurant delivery, a ride-sharing driver, etc. In embodiments such as these, a driver responsibility rating may be transmitted to a remote computing system (e.g., third party server 18 of FIG. 1) for display to one or more individuals positioned to act upon the information (e.g., hire the individual associated with the responsibility rating).

As yet another example, the responsibility rating may be used to enable "IOUs" with particular service providers (e.g., a taxi service, ride-sharing service, etc.). In embodiments such as these, responsibility ratings of driver profiles may be transmitted to a remote computing system (e.g., third party server 18 of FIG. 1), after which the computing system may indicate to one or more agents of the service provider that an IOU may be accepted from the individual.

V. EXEMPLARY MAPPING OF DRIVER PROFILE TO SUGGESTED VEHICLES

Figure 4:
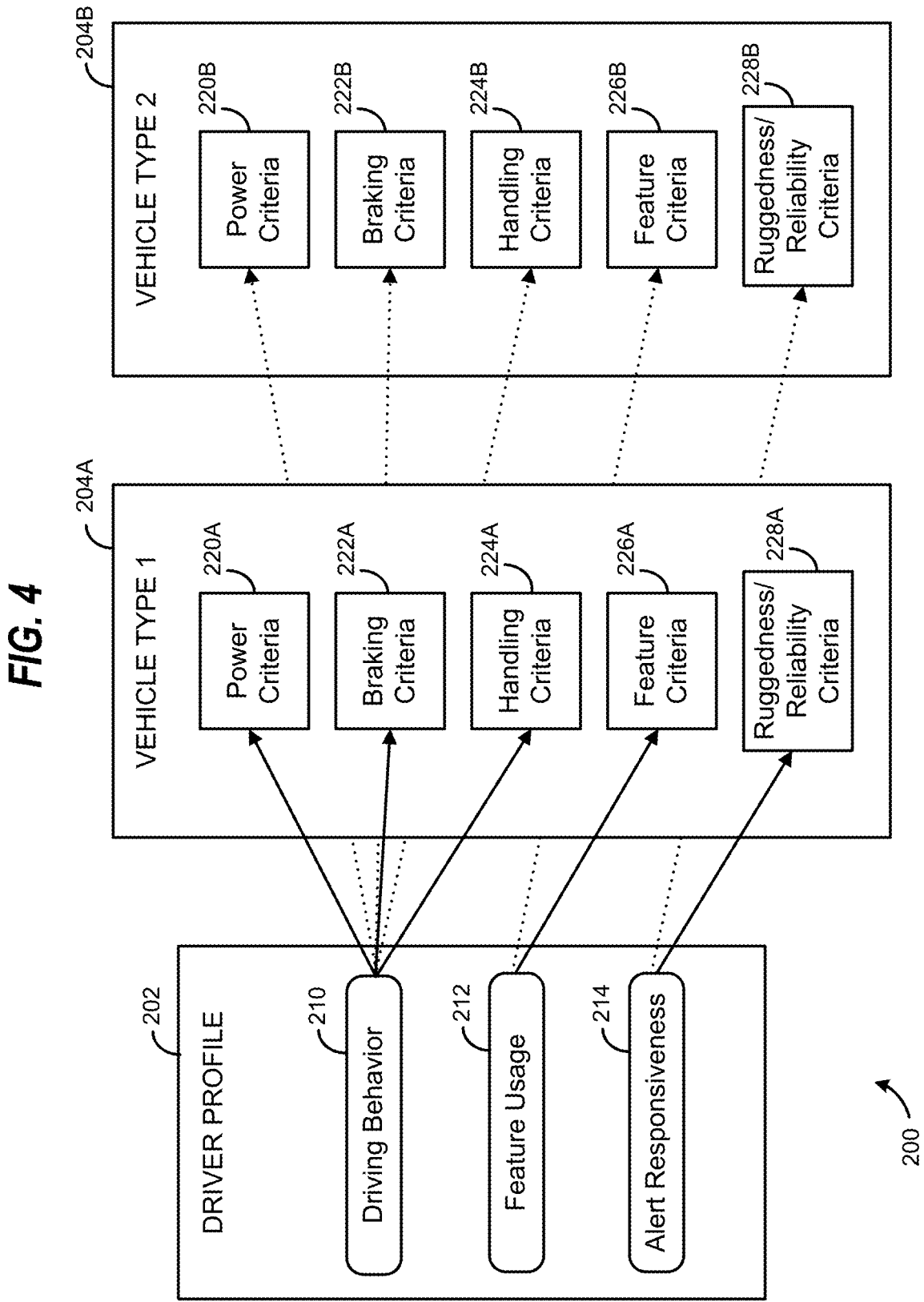
FIG. 4 depicts an exemplary mapping of a driver profile to criteria associated with particular vehicles.

FIG. 4 depicts an exemplary mapping 200 of a driver profile 202 to criteria associated with particular types of vehicles. As used herein, a vehicle "type" may correspond to a particular make, model, and/or year, for example. The mapping 200 may be used by vehicle identification unit 84 of FIG. 1 to identify one or more vehicle types that are well-suited to the driver for one or more reasons. For example, the mapping 200 may be used to identify one or more vehicles that have characteristics that match a driving style of an individual, and/or are less likely to have problems in view of the individual's driving style.

Once a particular vehicle or vehicles has/have been identified, the vehicle(s) may be presented as a suggested vehicle for the individual (e.g., by computer system 16 of FIG. 1 causing a display of computer system 16 to display the suggested vehicle(s), and/or transmitting data indicative of the suggested vehicle(s) to another, remote computer system for display, etc.). The suggestion(s) may be useful to the driver, an auto dealer wishing to target its advertising, and/or an auto manufacturer wishing to collect data for market research, for example.

In the mapping 200, information in the driver profile 202 is compared against first criteria 204A associated with a first vehicle type (e.g., a first make, model, and/or year of vehicle), and against second criteria 204B associated with a second vehicle type (e.g., a second make, model, and/or year of vehicle). While FIG. 4 only shows the criteria of two types of vehicles, it is understood that driver profile 202 may be compared against the criteria of additional different vehicle types (e.g., 5, 10, 100, etc.). Further, in some embodiments, criteria 204A and/or criteria 204B may include more, fewer, and/or different types of criteria than are shown in FIG. 4.

Driver profile 202 (e.g., a driver profile included in driver profile database 76 of FIG. 1) may include driving behavior information 210, feature usage information 212, and alert responsiveness information 214, which may correspond to driving behavior information 152, feature usage information 154, and alert responsiveness information 156, respectively, of FIG. 3. In the example mapping 200, the first criteria 204A and the second criteria 204B include the same general types of criteria: power criteria 220A (or 220B), braking criteria 222A (or 222B), handling criteria 224A (or 224B), feature criteria 226A (or 226B), and ruggedness/reliability criteria 228A (or 228B). In other embodiments, the first criteria 204A and second criteria 204B may have different numbers and/or types of criteria.

Power criteria 220A and/or 220B may include one or more criteria relating to acceleration patterns, engine RPM patterns, and/or other patterns that may be indicative of how much a driver values or needs a powerful (e.g., high horse-power) vehicle. For example, power criteria 220A and/or 220B may include a minimum frequency with which a vehicle is driven with at least some threshold acceleration (as an absolute value, or as a percentage of a maximum possible acceleration for the vehicle being driven, etc.), and/or a requirement that engine RPMs fall (with some threshold frequency) within certain ranges at different points in time when accelerating from a stop to a given speed.

As shown by arrows in FIG. 4, driving behavior information 210 (e.g., determined acceleration patterns, etc.) in driver profile 202 may be used to determine whether power criteria 220A and/or 220B are satisfied. If the first criteria 204A are associated with a sedan having a four-cylinder engine and the second criteria 204BV are associated with a sedan having a six- or eight-cylinder engine, for example, driving behavior information 210 that is indicative of more aggressive acceleration patterns might meet power criteria 220B but fail to meet power criteria 220A.

Braking criteria 222A and/or 222B may include one or more criteria relating to braking patterns, and/or other patterns that may be indicative of how important good (e.g., fast, reliable) braking ability is to a driver. For example, braking criteria 222A and/or 222B may include a set of minimum and/or maximum average tailgating distances, each corresponding to a different speed range, with the assumption being that a driver who follows other vehicles closely at higher speeds may need highly responsive and reliable braking ability. As shown by arrows in FIG. 4, driving behavior information 210 (e.g., average tailgating distances, braking patterns, etc.) in driver profile 202 may be used to determine whether braking criteria 220A and/or 220B are satisfied.

Handling criteria 224A and/or 224B may include one or more criteria relating to cornering patterns, and/or other patterns that may be indicative of how important good handing performance is to a driver. For example, handling criteria 224A and/or 224B may include minimum average speeds for different turn radii, and/or specifications of acceleration patterns throughout turns having different radii, etc., with the assumption being that a driver who takes turns and/or curves in the road aggressively may need or prefer a vehicle with good handling performance. As shown by arrows in FIG. 4, driving behavior information 210 (e.g., cornering patterns, possibly for specific types of road surface materials, etc.) in driver profile 202 may be used to determine whether handling criteria 224A and/or 224B are satisfied.

Feature criteria 226A and/or 226B may include one or more criteria relating to vehicle feature usage, and/or other patterns that may be indicative of how important various vehicle features are to a driver. For example, feature criteria 226A and/or 226B may include a minimum frequency and/or length of use for cruise control usage, entertainment system usage, automatic vehicle door opener usage, power seat control usage, etc., with the assumption being that a driver who uses a particular feature often and/or for long time periods may prefer a vehicle with those features. As shown by arrows in FIG. 4, feature usage information 212 in driver profile 202 may be used to determine whether feature criteria 226A and/or 226B are satisfied.

Ruggedness/reliability criteria 228A and/or 228B may include one or more criteria relating to how responsive a driver is to alerts/warnings, and/or other patterns that may be indicative of how well a driver maintains a vehicle. For example, ruggedness/reliability criteria 228A and/or 228B may include maximum time periods for responding to various types of alerts (e.g., a check engine or low tire pressure alert, if such alerts have occurred), with the assumption being that a driver who does not respond to certain types of alerts in a reasonable amount of time may need or prefer a vehicle that is known to be more rugged or reliable (e.g., statistically requires less repair and/or maintenance). As shown by arrows in FIG. 4, alert responsiveness information 214 in driver profile 202 may be used to determine whether ruggedness/reliability criteria 228A and/or 228B are satisfied.

In some embodiments, vehicle identification unit 84 of FIG. 1 may determine that driver profile 202 satisfies first criteria 204A (or second criteria 204B) if and only if driver profile 202 satisfies all of the individual types of criteria 220A through 228A (or 220B through 228B). In other embodiments, other rules for satisfying first criteria 204A and/or second criteria 204B are used. For example, vehicle identification unit 84 may determine that driver profile 202 satisfies first criteria 204A (or second criteria 204B) if and only if driver profile 202 satisfies four of five of the individual types of criteria 220A through 228A (or 220B through 228B). As another example, vehicle identification unit 84 may assign a score based upon how well driver profile 202 meets the individual types of criteria 220A through 228A (or 220B through 228B), and determine whether the criteria 204A (or 204B) are satisfied based upon whether a total score (summing the individual scores) exceeds a predetermined threshold.

In some embodiments, only a fixed number of vehicle types (e.g., the N types with the highest total score(s), or with the most matching types of criteria, etc., where N is an integer greater than zero) can be identified for a particular driver profile 202. In other embodiments, a variable number of vehicle types can be identified, so long as the respective criteria are satisfied. Once one or more vehicle types have been identified, vehicle identification unit 84 may cause the identified type(s) to be displayed as vehicle suggestions, as discussed above in connection with FIG. 1.

VI. EXEMPLARY MAPPING OF DRIVER PROFILE TO SUGGESTED VEHICLE COMPONENTS

Figure 5:
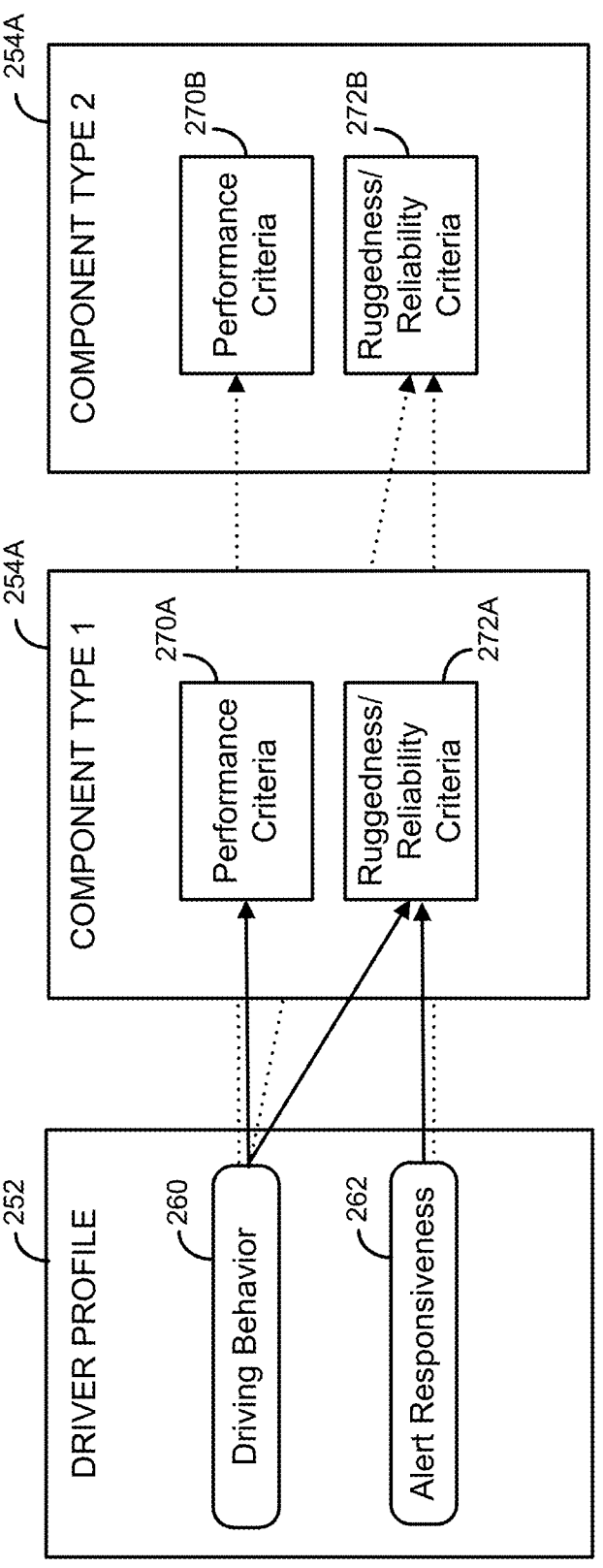
FIG. 5 depicts an exemplary mapping of a driver profile to criteria associated with particular vehicle components.

FIG. 5 depicts an exemplary mapping 250 of a driver profile 252 to criteria associated with particular types of vehicle components. As used herein, a vehicle component "type" may correspond to a particular brand and/or part number of a particular component (e.g., brake pads, rotors, tires, etc.), for example. The mapping 250 may be used by vehicle component identification unit 86 of FIG. 1 to identify one or more vehicle component types that are well-suited to the driver for one or more reasons. For example, the mapping 250 may be used to identify one or more vehicle components that have characteristics that match a driving style of an individual, and/or are less likely to have problems in view of the individual's driving style.

Once a particular vehicle component or components has/have been identified, the component(s) may be presented as a suggested component for the individual (e.g., by computer system 16 of FIG. 1 causing a display of computer system 16 to display the suggested component(s), and/or transmitting data indicative of the suggested component(s) to another, remote computer system for display, etc.). The suggestion(s) may be useful to the driver, an auto parts dealer wishing to target its advertising, and/or an auto parts manufacturer wishing to collect data for market research, for example.

In the mapping 250, information in the driver profile 252 is compared against first criteria 254A associated with a first component type (e.g., a first brand or part number), and against second criteria 254B associated with a second component type (e.g., a second brand or part number). While FIG. 5 only shows the criteria of two types of vehicle components, it is understood that driver profile 252 may be compared against the criteria of additional component types (e.g., 5, 10, 20, etc.). Further, in some embodiments criteria 254A and/or criteria 254B may include more, fewer, and/or different types of criteria than are shown in FIG. 5.

Driver profile 252 (e.g., a driver profile included in driver profile database 76 of FIG. 1) may include driving behavior information 260 and alert responsiveness information 262, which may correspond to driving behavior information 152 and alert responsiveness information 156, respectively, of FIG. 3. In the example mapping 250, the first criteria 254A and the second criteria 254B include the same general types of criteria: performance criteria 270A (or 270B) and ruggedness/reliability criteria 272A (or 272B). In other embodiments, the first criteria 254A and second criteria 254B may have different numbers and/or types of criteria.

Performance criteria 270A and/or 270B may include one or more criteria relating to acceleration patterns, braking patterns, cornering patterns, tailgating patterns, and/or other patterns that may be indicative of how much a driver is likely to need a particular level of performance or particular performance characteristics. For example, performance criteria 270A and/or 270B may include a minimum average tailgating distance at each of a number of different speeds, minimum average speeds for different turn radii, and/or specifications of acceleration patterns throughout turns having different radii, etc., with the assumption being that a driver who tends to follow other vehicles at a short distance may need higher-performance tires, brake pads and/or rotors, or that a driver who takes turns and/or curves in the road aggressively may need tires that grip the road better (e.g., tires with a particular tread and/or made of a particular material), etc. As shown by arrows in FIG. 5, driving behavior information 260 (e.g., determined acceleration patterns, tailgating distances, etc.) in driver profile 252 may be used to determine whether performance criteria 270A and/or 270B are satisfied.

Ruggedness/reliability criteria 272A and/or 272B may include one or more criteria relating to acceleration patterns, braking patterns, and/or cornering patterns (and/or other patterns that may be indicative of how much wear and tear a driver may cause to particular vehicle components), and/or may include one or more criteria relating to how responsive a driver is to alerts/warnings (and/or other patterns that may be indicative of how well a driver maintains a vehicle). For example, ruggedness/reliability criteria 272A and/or 272B may include a average braking distance to reach zero miles per hour for each of a number of different starting speeds, and/or average speed for each of a number of different turn radii, with the assumption being that a driver who brakes more forcefully (and/or takes turns/corners more aggressively) may need or desire vehicle components (e.g., tires, brake pads, rotors, etc.) that do not wear or malfunction as easily. As another example, ruggedness/reliability criteria 272A and/or 272B may also (or instead) include maximum time periods for responding to various types of alerts (e.g., a check engine or low tire pressure alert, if such alerts have occurred), with the assumption being that a driver who does not respond to certain types of alerts in a reasonable amount of time may need or prefer a vehicle component that is known to be more rugged, reliable, and/or longer lasting. As shown by arrows in FIG. 5, alert responsiveness information 262 in driver profile 252 may be used to determine whether ruggedness/reliability criteria 272A and/or 272B are satisfied.

In some embodiments, vehicle identification unit 84 of FIG. 1 may determine that driver profile 252 satisfies first criteria 254A (or second criteria 504B) if and only if driver profile 252 satisfies both of the individual types of criteria 270A and 272A (or 270B and 272B). In other embodiments, other rules for satisfying first criteria 254A and/or second criteria 254B are used. For example, vehicle identification unit 84 may assign a score based upon how well driver profile 252 meets the individual types of criteria 270A and 272A (or 270B and 272B), and determine whether the criteria 254A (or 254B) are satisfied based upon whether a total score (summing the individual scores) exceeds a predetermined threshold.

In some embodiments, only a fixed number of vehicle component types (e.g., the N types with the highest total score(s), or with the most matching types of criteria, etc., where N is an integer greater than zero) may be identified for a particular driver profile 252. In other embodiments, a variable number of vehicle component types may be identified, so long as the respective criteria are satisfied. Once one or more vehicle component types have been identified, vehicle identification unit 84 may cause the identified component type(s) to be displayed as vehicle component suggestions, as discussed above in connection with FIG. 1.

VII. EXEMPLARY COMPUTER-IMPLEMENTED METHOD FOR DETECTING AND ACTING UPON RESPONSIVENESS TO VEHICLE ALERTS

FIG. 6 is a flow diagram of an exemplary computer-implemented method 300 for detecting and acting upon driver responsiveness to vehicle alerts. The method 300 may be implemented by data analysis unit 74 or data processing unit 54 of FIG. 1, for example.

In the method 300, it may be determined that an on-board system of a vehicle (e.g., on-board system 14 of vehicle 12 in FIG. 1) has indicated, to a driver of the vehicle at a first time, that a subsystem of the vehicle requires repair, service, or maintenance (block 302). For example, it may be determined that the on-board system indicated a low oil level, that a tire pressure was out of a recommended range, or that the engine should be checked. The time may be determined as a specific time (e.g., corresponding to a time stamp), or a time range (e.g., on or before a particular date), for example.

In some embodiments and/or scenarios, block 302 may include receiving vehicle data that was generated by the on-board system of the vehicle (e.g., by diagnostic subsystem 46 of on-board system 14 in FIG. 1). The vehicle data may include one or more diagnostic fault codes, and may further include a plurality of time stamps associated with the diagnostic fault code(s). In one embodiment where the method 300 is implemented by a server remote from the vehicle (e.g., a server of computer system 16 of FIG. 1), the vehicle data may be received at the server, from the on-board system, via a wireless link (e.g., via network 20 of FIG. 1).

An amount of time that has elapsed since the first time without the subsystem being repaired, serviced, or maintained may be detected (block 304). If time stamps were received with vehicle data at block 302, block 304 may include calculating a time difference between two of the time stamps (e.g., an earliest time stamp associated with a diagnostic code indicating the presence of a check engine or other alert, and an earliest time stamp associated with a diagnostic code indicating the absence of that same alert). In a scenario where the subsystem was not serviced prior to some predetermined threshold length of time (e.g., one month, three months, etc.), the detected amount of time may be the threshold length of time.

Based upon the determination at block 304, a driver profile associated with the driver (e.g., in driver profiles database 76 of FIG. 1) may be adjusted to reflect that a sufficiently small amount of time has elapsed (block 306). Block 306 may correspond to the generation of a new driver profile and/or new driver profile fields, or to the update of an existing driver profile.

Transmission, to a particular entity, of at least the portion of the driver profile that was set at block 306 may be caused to occur (block 308), e.g., by generating an instruction to transmit the profile or a profile portion. The entity may be an entity (e.g., financial institution) that improves a credit rating associated with the driver based upon the profile or profile portion, an entity (e.g., an insurer) that improves an insurance rating associated with the driver based upon the profile or profile portion, an entity (e.g., an employer) that reviews the profile or profile portion in connection with a job sought by the driver, or an entity (e.g., a rental vehicle company, taxi service, etc.) that offers a permanent or temporary credit (e.g., a discount or IOU), in connection with a good or service offered by the entity based upon the profile or profile portion, for example.

In some embodiments, the method 300 may include one or more blocks not shown in FIG. 6. For example, the method 300 may include an additional block, between blocks 304 and 306, at which it is determined that the amount of time elapsed since the time of an earliest time stamp associated with a diagnostic code indicating the presence of a check engine or other alert is greater than a predetermined threshold amount of time (as discussed above). In such an embodiment, block 306 may include lowering a rating (e.g., responsibility rating) of the driver profile in response to determining that the amount of time elapsed is greater than the pre-determined threshold amount of time. Additionally or alternatively, the additional block, between blocks 304 and 306, may include determining that the amount of time elapsed since the time of an earliest time stamp associated with a diagnostic code indicating the presence of a check engine or other alert is less than or equal to a predetermined threshold amount of time. In such an embodiment, block 306 may include increasing or raising a rating (e.g., responsibility rating) of the driver profile in response to determining that the amount of time elapsed is less than or equal to the pre-determined threshold amount of time.

As another example, the method 300 may include a first additional block at which telematics data (e.g., operational data indicative of how the driver operates the vehicle) collected by one or more electronic subsystems located on or in the vehicle, and/or collected by a mobile electronic device of the driver or a passenger, is received, and a second additional block at which the received telematics data is analyzed to identify driving behaviors of the driver. In such an embodiment, block 306 may include setting the profile or profile portion based upon the detected amount of time elapsed, and further based upon the identified driving behaviors. The method may include additional, less, or alternate actions, including those discussed elsewhere herein.

VIII. EXEMPLARY COMPUTER-IMPLEMENTED METHOD FOR DETECTING AND ACTING UPON DRIVER COMPLIANCE WITH DRIVER-SPECIFIC LIMITATIONS

FIG. 7 is a flow diagram of an exemplary computer-implemented method 320 for detecting and acting upon driver compliance with driver-specific limitations. The method 320 may be implemented by data analysis unit 74 or data processing unit 54 of FIG. 1, for example.

In the method 320, it may be determined that a driver of a vehicle has one or more limitations specific to a medical condition, and/or physical characteristic, of the driver (block 322). For example, it may be determined that the driver has impaired vision (e.g., shortsightedness or poor night vision), that the driver has impaired motor skills (e.g., causing slow reaction times), and so on. Block 322 may include requesting one or more records from a remote server via a network (e.g., from third party server 18 of FIG. 1 via network 20), for example.

Telematics data, collected during one or more time periods by one or more subsystems located on or in the vehicle and/or by a mobile electronic device of the driver or a passenger, may be received (block 324). The telematics data may include sensor data (e.g., data from external sensor 30 and/or external sensor 32 of FIG. 1, and/or from a sensor of a mobile electronic device, etc.), and may be indicative of an environment external to the vehicle during the time period(s) in which the telematics data was collected by the vehicle subsystem(s). As another example, the telematics data may include operational data indicative of speeds of the vehicle during the time period(s).

The telematics data received at block 324 may be analyzed to identify a plurality of driving behaviors that the driver exhibited during the time period(s) in which the telematics data was collected (block 326). If the telematics data includes sensor data indicative of the external environment of the vehicle, for example, the sensor data may be analyzed to determine distances, during the time period(s), between the vehicle and other vehicles (e.g., other vehicles in front of the vehicle at various times).

Based at least upon the driving behaviors identified at block 326, a level of compliance with the limitation(s), during the time period(s) in which the telematics data was collected, may be determined (block 328). If distances to other vehicles were determined at block 326, for example, block 328 may include calculating one or more metrics based at least upon those distances, and determining the level of compliance at least in part based upon the calculated metric(s) and known correlations between "safe" distances and limitations of the sort exhibited by the driver.

Based upon the determination at block 328, a driver profile associated with the driver may be adjusted to reflect a satisfactory level of compliance (block 330). Block 330 may correspond to the generation of a new driver profile and/or new driver profile fields, or to the update of an existing driver profile.

Transmission, to a particular entity, of at least the portion of the driver profile may be caused to occur (block 332), e.g., by generating an instruction to transmit the profile or profile portion. The entity may be an entity (e.g., financial institution) that improves a credit rating associated with the driver based upon the profile or profile portion, an entity (e.g., an insurer) that improves an insurance rating associated with the driver based upon the profile or profile portion, an entity (e.g., an employer) that reviews the profile or profile portion in connection with a job sought by the driver, or an entity (e.g., a rental vehicle company, taxi service, etc.) that offers a permanent or temporary credit (e.g., a discount or IOU), in connection with a good or service offered by the entity based upon the profile or profile portion, for example. The method may include additional, less, or alternate actions, including those discussed elsewhere herein.

IX. EXEMPLARY COMPUTER-IMPLEMENTED METHOD FOR DETECTING AND ACTING UPON DRIVER BEHAVIOR WHILE DRIVING WITH PASSENGERS

FIG. 8 is a flow diagram of an exemplary computer-implemented method 340 for detecting and acting upon driver behavior while driving with passengers. The method 340 may be implemented by data analysis unit 74 or data processing unit 54 of FIG. 1, for example.

In the method 340, telematics data, collected by one or more electronic subsystems located on or in a vehicle, and/or by a mobile electronic device of a driver or passenger in the vehicle, may be received (block 344). The telematics data may include image data that was collected by a camera mounted in the vehicle (e.g., a camera of internal sensor(s) 38 of FIG. 1), weight sensor data that was collected by one or more weight sensors installed within one or more seats of the vehicle (e.g., one or more weight sensors of internal sensor(s) 38), seat belt data that was generated by an on-board system of the vehicle (e.g., on-board system 14), operational data of the vehicle, sensor data indicative of an environment external to the vehicle, and/or other data.

The telematics data received at block 344 may be analyzed to identify one or more time periods during which a driver of the vehicle drove with one or more passengers, and to identify one or more driving behaviors of the driver during the identified time period(s) (block 346). As one example, in some embodiments where the telematics data includes image data collected by a camera mounted within the vehicle, block 346 may include applying an image recognition algorithm to the image data to determine when passengers were within the vehicle. As another example, in some embodiments where the telematics data includes weight sensor data collected by one or more weight sensors installed in seats, block 346 includes analyzing the weight sensor data to determine when passengers were within the vehicle. As yet another example, in some embodiments where the telematics data includes seat belt data generated by an on-board system of the vehicle, block 346 includes analyzing the seat belt data to determine when passengers were within the vehicle.

In some embodiments where the telematics data includes sensor data indicative of an environment external to the vehicle (i.e., the environment during the time periods in which one or more passengers were present), block 346 includes analyzing the sensor data to identify at least one of the one or more driving behaviors. Additionally or alternatively, in some embodiments where the telematics data includes operational data indicative of how the driver operated the vehicle, block 346 includes analyzing the operational data to identify at least one of the driving behaviors.

Generally, the driving behaviors may be indicative of how much care was taken by the driver while carrying one or more passengers. For example, the driving behaviors may include average distances between the vehicle and other vehicles during the identified period(s), lane usage of the vehicle during the identified time period(s), and/or any other suitable driving behaviors, including any of those discussed in connection with FIG. 1 or FIG. 3. In some embodiments, like driving behaviors are also identified for times when no passengers are carried, e.g., to allow a determination of how the driver modifies his or her driving when entrusted with passengers.

Based upon the time period(s) and driving behavior(s) identified at block 346, a driver profile associated with the driver may be adjusted to reflect risk-averseness of the driving behavior(s) during the time period(s) (block 348). Block 348 may correspond to the generation of a new driver profile and/or new driver profile fields, or to the update of an existing driver profile. In some embodiments, block 346 includes determining a specific number of passengers during each of the identified time periods, and block 348 includes adjusting the profile based not only upon the driving behavior(s) during the identified time period(s), but also based upon on the specific number of passengers during each of those time periods. As indicated above, the profile or profile portion may also, or instead, be adjusted based upon how the driver modifies his or her driving compared to when he or she drives alone.

Transmission, to a particular entity, of at least the portion of the driver profile may be caused to occur (block 350), e.g., by generating an instruction to transmit the profile or profile portion. The entity may be an entity (e.g., financial institution) that improves a credit rating associated with the driver based upon the profile or profile portion, an entity (e.g., an insurer) that improves an insurance rating associated with the driver based upon the profile or profile portion, an entity (e.g., an employer) that reviews the profile or profile portion in connection with a job sought by the driver, or an entity (e.g., a rental vehicle company, taxi service, etc.) that offers a permanent or temporary credit (e.g., a discount or IOU), in connection with a good or service offered by the entity, based upon the profile or profile portion, for example. The method may include additional, less, or alternate actions, including those discussed elsewhere herein.

X. EXEMPLARY COMPUTER-IMPLEMENTED METHOD FOR IDENTIFYING A SUGGESTED VEHICLE FOR A DRIVER

FIG. 9 is a flow diagram of an exemplary computer-implemented method 400 for identifying a suggested vehicle for a driver. The method 400 may be implemented by data analysis unit 74 or data processing unit 54 of FIG. 1, for example.

In the method 400, telematics data, collected during one or more time periods by one or more electronic subsystems located on or in a vehicle, and/or by a mobile electronic device (such as a mobile device running a telematics data gathering application), may be received (block 402). The telematics data may include operational data indicative of how a driver operated the vehicle during the time period(s). The telematics data may also include data indicative of how and/or how often the driver used one or more features of the vehicle during the time period(s), sensor data indicative of an environment external to the vehicle during the time period(s), and/or other data, for example.

The telematics data received at block 402 may be analyzed to identify one or more driving behaviors of the driver during the one or more time periods (block 404). The driving behavior(s) may include acceleration patterns, braking patterns, and/or cornering patterns of the driver, for example. As another example, the driving behavior(s) may include distances between the vehicle and other vehicles (e.g., tailgating distance) during the time period(s). As yet another example, the driving behavior(s) may include driving behaviors, during the time period(s), that took place in specific weather conditions (e.g., weather conditions as identified based upon sensor data included in the telematics data).

Based at least upon the driving behavior(s) identified at block 404, a driver profile associated with the driver may be generated or modified (block 406). The profile may be caused to indicate an acceleration preference, braking preference, and/or cornering preference of the driver (e.g., by way of indicating the frequent occurrence of certain acceleration, braking, and/or cornering patterns for the driver), for example. As another example, the profile may be caused to indicate one or more preferred features (e.g., by way of indicating frequent driver usage of those features), and/or a preferred level of reliability or ruggedness (e.g., by way of indicating the driver's tendencies to address repair, service, and/or maintenance issues in a timely or untimely manner).

Based at least upon the driver profile that was generated or modified at block 406, a suggested vehicle type (e.g., make, model, and/or year) may be identified (block 408). The identification at block 408 may be made at least in part by determining that the driver profile meets a set of one or more matching criteria associated with the suggested vehicle type. For example, block 408 may include determining that a certain matching score is achieved. As another example, block 408 may include determining that an acceleration preference of the driver meets a first criterion of the set of matching criteria, that a braking preference of the driver meets a second criterion of the set of matching criteria, and/or that a cornering preference of the driver meets a third criterion of the set of matching criteria.

As yet another example, block 408 may include determining that the suggested vehicle type provides one or more preferred features as indicated in the driver profile, and/or that the suggested vehicle type has a level of reliability that satisfies a preferred level of reliability of the driver as indicated in the driver profile, etc. In some embodiments, the suggested vehicle type may be identified by causing the generated or modified driver profile to be transmitted to a third party (e.g., third party server 18 of FIG. 1, via network 20), and receiving in response from the third party the indication of the suggested vehicle type.

An indication of the suggested vehicle type may be caused to be displayed to a user (block 410), e.g., by generating an instruction to display the suggested vehicle type or an instruction to transmit a message indicating the suggested vehicle type. The display may be presented via a web browser application or dedicated application executed by a computing device of the user (e.g., the driver, by way of transmitting, via a computer network, the indication of the suggested vehicle type to a computing device of the driver), or may be presented to an agent of a computing system implementing the method 400, for example. The method may include additional, less, or alternate actions, including those discussed elsewhere herein.

XI. EXEMPLARY COMPUTER-IMPLEMENTED METHOD FOR IDENTIFYING A SUGGESTED VEHICLE COMPONENT FOR A DRIVER

FIG. 10 is a flow diagram of an exemplary computer-implemented method 420 for identifying a suggested vehicle component for a driver. The method 420 may be implemented by data analysis unit 74 or data processing unit 54 of FIG. 1, for example.

In the method 420, telematics data, collected during one or more time periods by one or more electronic subsystems located on or in a vehicle, and/or by a mobile electronic device (e.g., by one or more sensors of a mobile electronic device running a telematics application), may be received (block 422). The telematics data may include operational data indicative of how a driver operated the vehicle during the time period(s). The telematics data may also include sensor data indicative of an environment external to the vehicle during the time period(s) and/or other data, for example.

The telematics data received at block 422 may be analyzed to identify one or more driving behaviors of the driver during the one or more time periods (block 424). The driving behavior(s) may include acceleration patterns, braking patterns, and/or cornering patterns of the driver, for example. As another example, the driving behavior(s) may include distances between the vehicle and other vehicles (e.g., tailgating distance) during the time period(s). As yet another example, the driving behavior(s) may include driving behaviors, during the time period(s), that took place in specific weather conditions (e.g., weather conditions identified based upon sensor data included in the telematics data).

Based at least upon the driving behavior(s) identified at block 424, a driver profile associated with the driver may be generated or modified (block 426). The profile may be caused to indicate an acceleration preference, braking preference, and/or cornering preference of the driver (e.g., by way of indicating the frequent occurrence of certain acceleration, braking, and/or cornering patterns for the driver), for example. As another example, the profile may be caused to indicate a preferred level of reliability or ruggedness (e.g., by way of indicating the driver's tendencies to address repair, service, and/or maintenance issues in a timely or untimely manner).

Based at least upon the driver profile that was generated or modified at block 426, a suggested vehicle component type (e.g., a specific part number, brand, etc., for tires, brake pads, rotors, or another vehicle component) may be identified (block 428). The identification at block 428 may be made at least in part by determining that the driver profile meets a set of one or more matching criteria associated with the suggested vehicle component type. For example, block 428 may include determining that a certain matching score is achieved. As another example, block 428 may include determining that an acceleration preference of the driver meets a first criterion of the set of matching criteria, that a braking preference of the driver meets a second criterion of the set of matching criteria, and/or that a cornering preference of the driver meets a third criterion of the set of matching criteria. In some embodiments, the suggested vehicle component type may be identified by causing the generated or modified driver profile to be transmitted to a third party (e.g., third party server 18 of FIG. 1, via network 20), and receiving in response from the third party the indication of the suggested vehicle component type.

An indication of the suggested vehicle component type may be caused to be displayed to a user (block 430), e.g., by generating an instruction to display the suggested vehicle type or an instruction to transmit a message indicating the suggested vehicle type. The display may be presented via a web browser application or dedicated application executed by a computing device of the user (e.g., the driver, by way of transmitting, via a computer network, the indication of the suggested vehicle component type to a computing device of the driver), or may be presented to an agent of a computing system implementing the method 420, for example. The method may include additional, less, or alternate actions, including those discussed elsewhere herein.

XII. EXEMPLARY COMPUTER SYSTEM FOR GENERATING AND/OR USING DRIVER PROFILES

Figure 11:
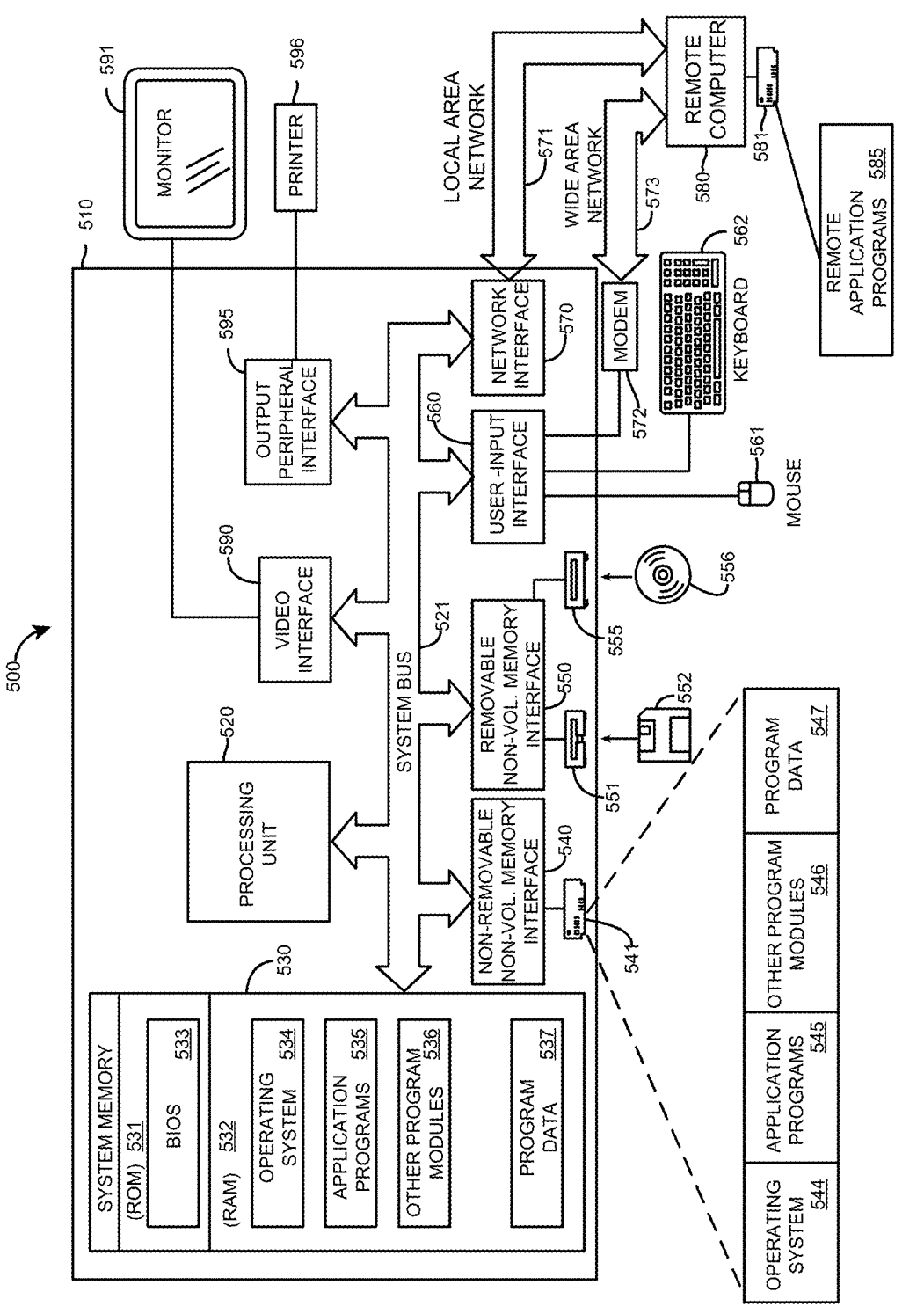
FIG. 11 is a block diagram of an exemplary computer system on which one or more of the embodiments described herein may be implemented.

FIG. 11 is a block diagram of an exemplary computer system 500 on which a method may operate in accordance with any of the embodiments described above. The computer system 500 of FIG. 11 includes a computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer-readable media. Computer-readable media can be any available media that can be accessed by computer 510 and includes both volatile and nonvolatile media, and both removable and non-removable media. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to, and/or presently being operated on by, processing unit 520. By way of example, and not limitation, FIG. 11 illustrates operating system 534, application programs 535, other program modules 536, and program data 537.

The computer 510 may also include other removable/non-removable, volatile/nonvolatile computer storage media. By way of example only, FIG. 11 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 11 provide storage of computer-readable instructions, data structures, program modules and other data for the computer 510. In FIG. 11, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different reference numbers in FIG. 11 to illustrate that, at a minimum, they are different copies. A user may enter commands and information into the computer 510 through input devices such as a keyboard 562 and cursor control device 561, commonly referred to as a mouse, trackball or touch pad. A monitor 591 or other type of display device is also connected to the system bus 521 via an interface, such as a graphics controller 590. In addition to the monitor 591, computers may also include other peripheral output devices such as printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 11. The logical connections depicted in FIG. 11 include a local area network (LAN) 571 and a wide area network (WAN) 573, but may also include other networks. Such networking environments are commonplace in hospitals, offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the input interface 560, or via another appropriate mechanism. In a networked environment, program modules depicted relative to the computer 510, or portions thereof, may be stored in the remote memory storage device 581. By way of example, and not limitation, FIG. 11 illustrates remote application programs 585 as residing on memory device 581.

The communications connections 570, 572 allow the device to communicate with other devices. The communications connections 570, 572 are an example of communication media, as discussed above.

The methods of any of the embodiments described above (e.g., methods 300, 320, 340, 400, and/or 420) may be implemented wholly or in part using one or more computer systems such as the computer system 500 illustrated in FIG. 11. Referring generally to the embodiments of FIG. 1, for example, the computer 510 may be used as some or all of computer system 16, with the various units 80, 82, 84, and 86 being instructions that are a part of application programs 535 stored in RAM 532 and/or application programs 545 stored in hard disk drive 541. As another example, data from on-board system 14 may be received via a modem similar to the modem 572, which may in turn be coupled to a network similar to network 20 of FIG. 1. As another example, indications of suggested vehicle types and/or vehicle component types generated by vehicle identification unit 84 and/or vehicle component identification unit 86 of FIG. 1 may be sent to a remote computing device (e.g., remote computer 580) for display to a user.

XIII. TECHNICAL ADVANTAGES

The aspects described herein may be implemented as part of one or more computer components, such a server device, for example. Furthermore, the aspects described herein may be implemented within a computer network architecture implementing vehicle telematics technology, and may leverage that architecture and technology to obtain new and beneficial results not previously achieved. Thus, the aspects described herein address and solve issues of a technical nature that are necessarily rooted in computer technology.

For instance, aspects described herein may include analyzing various sources of vehicle data to identify certain driving behaviors that are not captured or recognized by conventional systems, such as driver compliance with driver-specific limitations (e.g., handicaps), driving performance in the presence of passengers, and driver responsiveness to warnings/alerts. Without the improvements provided by capturing such driving behaviors, the accurate assessment of risk, trustworthiness, etc. (as the case may be, depending upon the particular embodiment) may require much larger samples of telematics data to be collected and processed. Naturally, this would result in additional memory usage, processing resources, and/or time. Thus, aspects described herein address computer-related issues that are related to efficiency, processing, and storage metrics, such as consuming less power and/or memory, for example.

XIV. EXEMPLARY COMPUTER-IMPLEMENTED METHOD EMBODIMENTS

In one aspect, a computer-implemented method for detecting and acting upon driver responsiveness to vehicle alerts may include: (1) determining, by one or more processors, that an on-board system of a vehicle indicated, to a driver of the vehicle and at a first time, that a subsystem of the vehicle requires repair, service or maintenance; (2) detecting, by the one or more processors, an amount of time elapsed since the first time without the subsystem being repaired, serviced or maintained; (3) setting, by the one or more processors and based at least upon the detected amount of time elapsed since the first time, at least a portion of a driver profile associated with the driver; and/or (4) causing, by the one or more processors, transmission of at least the portion of the driver profile to an entity that (i) adjusts a credit rating associated with the driver based upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based upon at least the portion of the driver profile. The method may include additional, fewer, and/or alternate actions, including those discussed elsewhere herein.

For instance, in various aspects, determining that the on-board system of the vehicle indicated that the subsystem of the vehicle requires repair, service or maintenance may include receiving vehicle data generated by the on-board system of the vehicle, the vehicle data including one or more diagnostic fault codes.

Additionally or alternatively, the vehicle data may further include a plurality of time stamps associated with the one or more diagnostic fault codes, and detecting the amount of time elapsed since the first time may include calculating a time difference between two time stamps of the plurality of time stamps.

Additionally or alternatively, receiving the vehicle data may include receiving the vehicle data from the on-board system of the vehicle, at a server remote from the vehicle, via a wireless link.

Additionally or alternatively, determining that the on-board system of the vehicle indicated that the subsystem of the vehicle requires repair, service or maintenance may include determining that the on-board system of the vehicle indicated to the driver that an oil level of the vehicle was low.

Additionally or alternatively, determining that the on-board system of the vehicle indicated that the subsystem of the vehicle requires repair, service or maintenance may include determining that the on-board system of the vehicle indicated to the driver that a tire pressure of the vehicle was out of a recommended range.

Additionally or alternatively, determining that the on-board system of the vehicle indicated that the subsystem of the vehicle requires repair, service or maintenance may include determining that the on-board system of the vehicle provided a check engine indicator to the driver.

Additionally or alternatively, the method may include: determining, by the one or more processors, that the amount of time elapsed since the first time is greater than a pre-determined threshold amount of time, wherein setting at least the portion of the driver profile may include lowering a rating of the driver profile in response to determining that the amount of time elapsed since the first time is greater than the pre-determined threshold amount of time.

Additionally or alternatively, causing transmission of at least the portion of the driver profile to an entity may include causing transmission of at least the portion of the driver profile to a financial institution that adjusts the credit rating associated with the driver based upon at least the portion of the driver profile.

Additionally or alternatively, causing transmission of at least the portion of the driver profile to an entity may include causing transmission of at least the portion of the driver profile to an employer that reviews at least the portion of the driver profile in connection with the job sought by the driver.

Additionally or alternatively, causing transmission of at least the portion of the driver profile to an entity may include causing transmission of at least the portion of the driver profile to an insurer that adjusts the insurance rating of the driver based upon at least the portion of the driver profile.

Additionally or alternatively, causing transmission of at least the portion of the driver profile to an entity may include causing transmission of at least the portion of the driver profile to a rental vehicle company that discounts a car rental offered to the driver based at least upon at least the portion of the driver profile.

Additionally or alternatively, the method may include: receiving telematics data that was collected by one or both of (i) one or more electronic subsystems located on or in the vehicle and (ii) a mobile electronic device of the driver or a passenger, wherein receiving the telematics data includes receiving operational data indicative of how the driver operated the vehicle; and analyzing, by the one or more processors, the received telematics data to identify a plurality of driving behaviors of the driver, wherein setting at least the portion of the driver profile may include setting at least the portion of the driver profile based at least upon (i) the detected amount of time elapsed since the first time and (ii) the plurality of driving behaviors.

In another aspect, a computer-implemented method for detecting and acting upon driver compliance with driver-specific limitations may include: (1) determining, by one or more processors, that a driver of a vehicle has one or more limitations specific to one or both of (i) a medical condition of the driver, and (ii) a physical characteristic of the driver; (2) receiving telematics data that was collected during one or more time periods by one or both of (i) one or more electronic subsystems located on or in the vehicle and (ii) a mobile electronic device of the driver or a passenger; (3) analyzing, by the one or more processors, the received telematics data to identify a plurality of driving behaviors of the driver during the one or more time periods; (4) determining, by the one or more processors and based at least upon the plurality of driving behaviors, a level of compliance with the one or more limitations during the one or more time periods; (5) based at least upon the determined level of compliance, setting, by the one or more processors, at least a portion of a driver profile associated with the driver; and/or (6) causing, by the one or more processors, transmission of at least the portion of the driver profile to an entity that (i) adjusts a credit rating associated with the driver based upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based at least upon at least the portion of the driver profile. The method may include additional, fewer, and/or alternate actions, including those discussed elsewhere herein.

For instance, in various aspects, determining that the driver has one or more limitations includes determining that the driver has impaired vision. Additionally or alternatively, determining that the driver has one or more limitations includes determining that the driver has impaired motor skills. Additionally or alternatively, determining that the driver has one or more limitations may include requesting one or more records from a remote server via a network. Additionally or alternatively, receiving telematics data may include receiving sensor data indicative of an environment external to the vehicle during the one or more time periods.

Additionally or alternatively, analyzing the received telematics data to identify a plurality of driving behaviors of the driver may include analyzing the sensor data to determine a plurality of distances, during the one or more time periods, between the vehicle and other vehicles. Additionally or alternatively, determining the level of compliance with the one or more limitations may include: calculating one or more metrics based at least upon the plurality of distances; and determining the level of compliance based at least upon the one or more metrics. A high level of compliance may, in turn, entitle the driver or vehicle owner to an insurance discount or other insurance cost-savings.

Additionally or alternatively, receiving telematics data may include receiving operational data indicative of a plurality of speeds of the vehicle during the one or more time periods. Additionally or alternatively, setting at least the portion of the driver profile may include lowering a compliance rating of the driver profile in response to determining that the level of compliance is below a pre-determined threshold level. As a result, risk averse drivers may receive insurance discounts or insurance cost-savings.

Additionally or alternatively, causing transmission of at least the portion of the driver profile to an entity may include causing transmission of at least the portion of the driver profile to a financial institution that adjusts the credit rating associated with the driver based upon at least the portion of the driver profile.

Additionally or alternatively, causing transmission of at least the portion of the driver profile to an entity may include causing transmission of at least the portion of the driver profile to an employer that reviews at least the portion of the driver profile in connection with the job sought by the driver.

Additionally or alternatively, causing transmission of at least the portion of the driver profile to an entity may include causing transmission of at least the portion of the driver profile to an insurer that adjusts the insurance rating of the driver based upon at least the portion of the driver profile.

Additionally or alternatively, causing transmission of at least the portion of the driver profile to an entity may include causing transmission of at least the portion of the driver profile to a rental vehicle company that discounts a car rental offered to the driver based upon at least the portion of the driver profile.

In another aspect, a computer-implemented method for detecting and acting upon driver behavior while driving with passengers may include: (1) receiving telematics data that was collected by one or both of (i) one or more electronic subsystems located on or in a vehicle and (ii) a mobile electronic device of a driver or a passenger in the vehicle; (2) analyzing, by one or more processors, the received telematics data to (i) identify one or more time periods during which the driver of the vehicle drove with one or more passengers, and (ii) identify one or more driving behaviors of the driver during the one or more time periods; (3) based at least upon the determined one or more driving behaviors of the driver during the one or more time periods, setting, by the one or more processors, at least a portion of a driver profile associated with the driver; and/or (4) causing, by the one or more processors, transmission of at least the portion of the driver profile to an entity that (i) adjusts a credit rating associated with the driver based upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based upon at least the portion of the driver profile. The method may include additional, fewer, and/or alternate actions, including those discussed elsewhere herein.

For instance, in various aspects, receiving telematics data may include receiving image data that was collected by a camera mounted within the vehicle, and analyzing the received telematics data to identify the one or more time periods during which the driver drove with one or more passengers may include applying an image recognition algorithm to the image data to determine when passengers were within the vehicle.

Additionally or alternatively, receiving telematics data may include receiving weight sensor data that was collected by one or more weight sensors installed within one or more seats of the vehicle, and analyzing the received telematics data to identify the one or more time periods during which the driver drove with one or more passengers may include analyzing the weight sensor data to determine when passengers were within the vehicle.

Additionally or alternatively, receiving telematics data may include receiving seat belt data that was collected by one or more sensors installed within the vehicle, and analyzing the received telematics data to identify the one or more time periods during which the driver drove with one or more passengers may include analyzing the seat belt data to determine when passengers were within the vehicle.

Additionally or alternatively, receiving telematics data may include receiving sensor data indicative of an environment external to the vehicle during the one or more time periods, and analyzing the received telematics data to identify one or more driving behaviors of the driver may include analyzing the sensor data to identify at least one of the one or more driving behaviors.

Additionally or alternatively, analyzing the received telematics data to identify the at least one driving behavior may include analyzing the received telematics data to identify one or both of: a plurality of distances, during the one or more time periods, between the vehicle and other vehicles; and lane usage of the vehicle during the one or more time periods.

Additionally or alternatively, receiving telematics data may include receiving operational data indicative of how the driver operated the vehicle during the one or more time periods; and analyzing the received telematics data to identify one or more driving behaviors of the driver may include analyzing the operational data to identify at least one of the one or more driving behaviors.

Additionally or alternatively, analyzing the received telematics data to identify the one or more time periods during which the driver drove with one or more passengers may include determining a specific number of passengers during each of the one or more time periods, and setting at least the portion of the driver profile based at least upon the determined one or more driving behaviors of the driver during the one or more time periods may include setting at least the portion of the driver profile based further on the specific number of passengers during each of the one or more time periods.

Additionally or alternatively, causing transmission of at least the portion of the driver profile to an entity may include causing transmission of at least the portion of the driver profile to a financial institution that adjusts the credit rating associated with the driver based upon at least the portion of the driver profile.

Additionally or alternatively, causing transmission of at least the portion of the driver profile to an entity may include causing transmission of at least the portion of the driver profile to an employer that reviews at least the portion of the driver profile in connection with the job sought by the driver.

Additionally or alternatively, causing transmission of at least the portion of the driver profile to an entity may include causing transmission of at least the portion of the driver profile to an insurer that adjusts the insurance rating of the driver based upon at least the portion of the driver profile.

Additionally or alternatively, causing transmission of at least the portion of the driver profile to an entity may include causing transmission of at least the portion of the driver profile to a rental vehicle company that discounts a car rental offered to the driver based upon at least the portion of the driver profile.

In another aspect, a computer-implemented method may include: (1) receiving telematics data that was collected during one or more time periods by one or more electronic subsystems located on or in a vehicle, and/or by a mobile electronic device or one or more mobile electronic device sensors, wherein receiving the telematics data may include receiving operational data indicative of how a driver of the vehicle operated the vehicle during the one or more time periods; (2) analyzing, by one or more processors, the received telematics data to identify one or more driving behaviors of the driver during the one or more time periods; (3) generating or modifying, by the one or more processors and based at least upon the one or more driving behaviors of the driver, a driver profile associated with the driver; (4) identifying, by one or more processors and based at least upon the generated or modified driver profile, a suggested vehicle type, wherein identifying the suggested vehicle type may include determining that the generated or modified driver profile meets a set of one or more matching criteria associated with the suggested vehicle type; and/or (5) causing, by the one or more processors, an indication of the suggested vehicle type to be displayed to a user. The method may include additional, fewer, and/or alternate actions, including those discussed elsewhere herein.

For instance, in various aspects, analyzing the received telematics data to identify the one or more driving behaviors of the driver during the one or more time periods may include identifying one or more of (i) acceleration patterns of the driver, (ii) braking patterns of the driver, or (iii) cornering patterns of the driver, and generating or modifying the driver profile based at least upon the one or more driving behaviors may include causing the driver profile to indicate one or more of (i) an acceleration preference of the driver, (ii) a braking preference of the driver, or (iii) a cornering preference of the driver.

Additionally or alternatively, determining that the generated or modified driver profile meets the set of one or more matching criteria may include determining one or more of (i) that the acceleration preference of the driver meets a first criterion of the set of matching criteria, (ii) that the braking preference of the driver meets a second criterion of the set of matching criteria, or (iii) that the cornering preference of the driver meets a third criterion of the set of matching criteria.

Additionally or alternatively, receiving the telematics data further may include receiving data indicative of how often the driver used one or more features of the vehicle during the one or more time periods, the one or more features not including features for controlling any of acceleration, braking or steering of the vehicle.

Additionally or alternatively, generating or modifying the driver profile associated with the driver may include causing the driver profile to indicate one or more preferred features, and determining that the generated or modified driver profile meets a set of one or more matching criteria associated with the suggested vehicle type may include determining that the suggested vehicle type provides the one or more preferred features.

Additionally or alternatively, receiving the telematics data further may include receiving sensor data indicative of an environment external to the vehicle during the one or more time periods, analyzing the received telematics data may include analyzing the sensor data to identify a plurality of distances, during the one or more time periods, between the vehicle and other vehicles, and generating or modifying the driver profile may be further based upon the plurality of distances.

Additionally or alternatively, receiving the telematics data may further include receiving sensor data indicative of an environment external to the vehicle during the one or more time periods, analyzing the received telematics data may include analyzing the sensor data to identify weather conditions during the one or more time periods, and generating or modifying the driver profile may further be based upon the weather conditions.

Additionally or alternatively, identifying the suggested vehicle type may include identifying a specific vehicle make. Additionally or alternatively, identifying the suggested vehicle type may include identifying a specific vehicle model. Additionally or alternatively, identifying the suggested vehicle type may include causing the generated or modified driver profile to be transmitted to a third party, and receiving the indication of the suggested vehicle type from the third party.

Additionally or alternatively, causing the indication of the suggested vehicle type to be displayed to the user may include transmitting, via a computer network, the indication of the suggested vehicle type to a computing device of the user.

In another aspect, a computer-implemented method may include: (1) receiving telematics data that was collected during one or more time periods by one or more electronic subsystems located on or in a vehicle, and/or by a mobile electronic device or one or more mobile electronic device sensors, wherein receiving the telematics data may include receiving operational data indicative of how a driver of the vehicle operated the vehicle during the one or more time periods; (2) analyzing, by one or more processors, the received telematics data to identify one or more driving behaviors of the driver during the one or more time periods; (3) generating or modifying, by the one or more processors and based at least upon the one or more of driving behaviors, a driver profile associated with the driver; (4) identifying, by the one or more processors, a suggested vehicle component type matching the generated or modified driver profile, wherein identifying the suggested vehicle component type may include determining that the generated or modified driver profile meets a set of one or more matching criteria associated with the suggested vehicle component type; and/ or (5) causing, by the one or more processors, an indication of the suggested vehicle component type to be displayed to a user. The method may include additional, fewer, and/or alternate actions, including those discussed elsewhere herein.

For instance, in various aspects, analyzing the received telematics data to identify the one or more driving behaviors of the driver during the one or more time periods may include identifying one or more of (i) acceleration patterns of the driver, (ii) braking patterns of the driver, or (iii) cornering patterns of the driver, and generating or modifying the driver profile based at least upon the one or more driving behaviors may include causing the driver profile to indicate one or more of (i) an acceleration preference of the driver, (ii) a braking preference of the driver, or (iii) a cornering preference of the driver.

Additionally or alternatively, determining that the generated or modified driver profile meets the set of one or more matching criteria may include determining one or more of (i) that the acceleration preference of the driver meets a first criterion of the set of matching criteria, (ii) that the braking preference of the driver meets a second criterion of the set of matching criteria, or (iii) that the cornering preference of the driver meets a third criterion of the set of matching criteria.

Additionally or alternatively, receiving the telematics data may further include receiving sensor data indicative of an environment external to the vehicle during the one or more time periods, analyzing the received telematics data may include analyzing the sensor data to identify a plurality of distances, during the one or more time periods, between the vehicle and other vehicles, and generating or modifying the driver profile may further be based upon the plurality of distances.

Additionally or alternatively, receiving the telematics data further may include receiving sensor data indicative of an environment external to the vehicle during the one or more time periods, analyzing the received telematics data may include analyzing the sensor data to identify weather conditions during the one or more time periods, and generating or modifying the driver profile may further be based upon the weather conditions.

Additionally or alternatively, identifying the suggested vehicle component type may include identifying a specific part number. Additionally or alternatively, identifying the suggested vehicle component type may include causing the generated or modified driver profile to be transmitted to a third party, and receiving the indication of the suggested vehicle component type from the third party. Additionally or alternatively, causing the indication of the suggested vehicle component type to be displayed to the user may include transmitting, via a computer network, the indication of the suggested vehicle component type to a computing device of the user.

XV. EXEMPLARY SYSTEM EMBODIMENTS

In one aspect, a computer system for detecting and acting upon driver responsiveness to vehicle alerts may include: (1)

one or more processors; and (2) a memory storing instructions that, when executed by the one or more processors, cause the computer system to (a) determine that an on-board system of a vehicle indicated, to a driver of the vehicle and at a first time, that a subsystem of the vehicle requires repair, service or maintenance, (b) detect an amount of time elapsed since the first time without the subsystem being repaired, serviced or maintained, (c) set, based at least upon the detected amount of time elapsed since the first time, at least a portion of a driver profile associated with the driver, and/or (d) transmit at least the portion of the driver profile to an entity that (i) adjusts a credit rating associated with the driver based upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based upon at least the portion of the driver profile. The system may include additional, less, or alternate functionality, including that discussed elsewhere herein.

For instance, in various aspects, the instructions may cause the computer system to determine that the on-board system of the vehicle indicated that the subsystem of the vehicle requires repair, service or maintenance at least by receiving vehicle data generated by the on-board system of the vehicle, the vehicle data including one or more diagnostic fault codes.

Additionally or alternatively, the vehicle data may further include a plurality of time stamps associated with the one or more diagnostic fault codes, and the instructions may cause the computer system to detect the amount of time elapsed since the first time at least by calculating a time difference between two time stamps of the plurality of time stamps.

In another aspect, a computer system for detecting and acting upon driver compliance with driver-specific limitations may include: (1) one or more processors; and (2) a memory storing instructions that, when executed by the one or more processors, cause the computer system to (a) determine that a driver of a vehicle has one or more limitations specific to one or both of (i) a medical condition of the driver, and (ii) a physical characteristic of the driver, (b) receive telematics data that was collected during one or more time periods by one or both of (i) one or more electronic subsystems located on or in the vehicle and (ii) a mobile electronic device of the driver or a passenger, (c) analyze the received telematics data to identify a plurality of driving behaviors of the driver during the one or more time periods, (d) determine, based at least upon the plurality of driving behaviors, a level of compliance with the one or more limitations during the one or more time periods, (e) based at least upon the determined level of compliance, set at least a portion of a driver profile associated with the driver, and/or (f) transmit at least the portion of the driver profile to an entity that (i) adjusts a credit rating associated with the driver based at least upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based upon at least the portion of the driver profile. The system may include additional, less, or alternate functionality, including that discussed elsewhere herein.

For instance, in various aspects, the one or more limitations may include one or both of (i) impaired vision and (ii) impaired motor skills. Additionally or alternatively, the telematics data may include sensor data indicative of an environment external to the vehicle during the one or more time periods. Additionally or alternatively, the telematics data may include operational data indicative of a plurality of speeds of the vehicle during the one or more time periods.

In another aspect, a computer system for detecting and acting upon driver behavior while driving with passengers may include: (1) one or more processors; and (2) a memory storing instructions that, when executed by the one or more processors, cause the computer system to (a) receive telematics data that was collected by one or both of (i) one or more electronic subsystems located on or in a vehicle and (ii) a mobile electronic device of a driver or a passenger in the vehicle, (b) analyze the received telematics data to (i) identify one or more time periods during which the driver of the vehicle drove with one or more passengers, and (ii) identify one or more driving behaviors of the driver during the one or more time periods, (c) based at least upon the determined one or more driving behaviors of the driver during the one or more time periods, set at least a portion of a driver profile associated with the driver, and/or (d) transmit at least the portion of the driver profile to an entity that (i) adjusts a credit rating associated with the driver based upon at least the portion of the driver profile, (ii) adjusts an insurance rating associated with the driver based upon at least the portion of the driver profile, (iii) reviews at least the portion of the driver profile in connection with a job sought by the driver, and/or (iv) offers a permanent or temporary credit, in connection with a good or service offered by the entity, based upon at least the portion of the driver profile. The system may include additional, less, or alternate functionality, including that discussed elsewhere herein.

For instance, in various aspects, the telematics data may include image data that was collected by a camera mounted within the vehicle, and the instructions may cause the computer system to analyze the received telematics data at least by applying an image recognition algorithm to the image data to determine when passengers were within the vehicle.

Additionally or alternatively, the telematics data may include weight sensor data that was collected by one or more weight sensors installed within one or more seats of the vehicle, and the instructions may cause the computer system to analyze the received telematics data at least by analyzing the weight sensor data to determine when passengers were within the vehicle.

Additionally or alternatively, the telematics data may include seat belt data that was collected by one or more sensors installed within the vehicle, and the instructions may cause the computer system to analyze the received telematics data at least by analyzing the seat belt data to determine when passengers were within the vehicle.

Additionally or alternatively, the instructions may cause the computer system to analyze the received telematics data at least by analyzing the received telematics data to identify one or both of: (i) a plurality of distances, during the one or more time periods, between the vehicle and other vehicles; and (ii) lane usage of the vehicle during the one or more time periods.

In another aspect, a computer system may include: (1) one or more processors; and (2) a memory storing instructions that, when executed by the one or more processors, cause the computer system to (a) receive telematics data that was collected during one or more time periods by one or more electronic subsystems located on or in a vehicle, and/or by a mobile electronic device, the telematics data including operational data indicative of how a driver of the vehicle operated the vehicle during the one or more time periods, (b) analyze the received telematics data to identify one or more driving behaviors of the driver during the one or more time periods, (c) generate or modify, based at least upon the one or more driving behaviors of the driver, a driver profile associated with the driver, (d) identify, based at least upon the generated or modified driver profile, a suggested vehicle type, at least by determining that the generated or modified driver profile meets a set of one or more matching criteria associated with the suggested vehicle type, and/or (e) cause an indication of the suggested vehicle type to be displayed to a user. The system may include additional, less, or alternate functionality, including that discussed elsewhere herein.

For instance, in various aspects, the one or more driving behaviors of the driver during the one or more time periods may include one or more of (i) acceleration patterns of the driver, (ii) braking patterns of the driver, or (iii) cornering patterns of the driver, and the instructions may cause the computer system to generate or modify the driver profile based at least upon the one or more driving behaviors at least by causing the driver profile to indicate one or more of (i) an acceleration preference of the driver, (ii) a braking preference of the driver, or (iii) a cornering preference of the driver.

Additionally or alternatively, the telematics data may further include data indicative of how often the driver used one or more features of the vehicle during the one or more time periods, and wherein the one or more features do not include features for controlling any of acceleration, braking or steering of the vehicle.

Additionally or alternatively, the instructions may cause the computer system to (1) generate or modify the driver profile associated with the driver at least by causing the driver profile to indicate one or more preferred features, and (2) determine that the generated or modified driver profile meets the set of one or more matching criteria associated with the suggested vehicle type at least by determining that the suggested vehicle type provides the one or more preferred features.

Additionally or alternatively, the telematics data may further include sensor data indicative of an environment external to the vehicle during the one or more time periods, the instructions may cause the computing system to analyze the received telematics data at least by analyzing the sensor data to identify a plurality of distances, during the one or more time periods, between the vehicle and other vehicles, and the instructions may cause the computing system to generate or modify the driver profile further based upon the plurality of distances.

Additionally or alternatively, the telematics data may further include sensor data indicative of an environment external to the vehicle during the one or more time periods, the instructions may cause the computing system to analyze the received telematics data at least by analyzing the sensor data to identify weather conditions during the one or more time periods, and the instructions may cause the computing system to generate or modify the driver profile further based upon the weather conditions.

In another aspect, a computer system may include: (1) one or more processors; and (2) a memory storing instructions that, when executed by the one or more processors, cause the computer system to (a) receive telematics data that was collected during one or more time periods by one or more electronic subsystems located on or in a vehicle, and/or by a mobile electronic device or one or more mobile electronic device sensors, wherein receiving the telematics data may include receiving operational data indicative of how a driver of the vehicle operated the vehicle during the one or more time periods, (b) analyze the received telematics data to identify one or more driving behaviors of the driver during the one or more time periods, (c) generate or modify, based at least upon the one or more driving behaviors, a driver profile associated with the driver, (d) identify a suggested vehicle component type matching the generated or modified driver profile, wherein identifying the suggested vehicle component type may include determining that the generated or modified driver profile meets a set of one or more matching criteria associated with the suggested vehicle component type, and/or (c) cause an indication of the suggested vehicle component type to be displayed to a user. The system may include additional, less, or alternate functionality, including that discussed elsewhere herein.

For instance, in various aspects, the one or more driving behaviors of the driver during the one or more time periods may include one or more of (i) acceleration patterns of the driver, (ii) braking patterns of the driver, or (iii) cornering patterns of the driver, and the instructions may cause the computer system to generate or modify the driver profile based at least upon the one or more driving behaviors at least by causing the driver profile to indicate one or more of (i) an acceleration preference of the driver, (ii) a braking preference of the driver, or (iii) a cornering preference of the driver.

Additionally or alternatively, the instructions may cause the computer system to determine that the generated or modified driver profile meets the set of one or more matching criteria at least by determining one or more of (i) that the acceleration preference of the driver meets a first criterion of the set of matching criteria, (ii) that the braking preference of the driver meets a second criterion of the set of matching criteria, or (iii) that the cornering preference of the driver meets a third criterion of the set of matching criteria.

Additionally or alternatively, the telematics data may further include sensor data indicative of an environment external to the vehicle during the one or more time periods, the instructions may cause the computing system to analyze the received telematics data at least by analyzing the sensor data to identify a plurality of distances, during the one or more time periods, between the vehicle and other vehicles, and the instructions may cause the computing system to generate or modify the driver profile further based upon the plurality of distances.

Additionally or alternatively, the telematics data may further include sensor data indicative of an environment external to the vehicle during the one or more time periods, the instructions may cause the computing system to analyze the received telematics data at least by analyzing the sensor data to identify weather conditions during the one or more time periods, and the instructions may cause the computing system to generate or modify the driver profile further based upon the weather conditions.

Additionally or alternatively, the suggested vehicle component type may be a specific part number. Additionally or alternatively, the instructions may cause the computer system to identify the suggested vehicle component type at least by: (1) causing the generated or modified driver profile to be transmitted to a third party; and (2) receiving the indication of the suggested vehicle component type from the third party.

XVI. ADDITIONAL CONSIDERATIONS

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or home occupant preferences or preference profiles), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for generating, modifying, and/or using driver profiles through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for monitoring vehicle on-board system software updates, the computer-implemented method comprising:
   receiving, by one or more processors of a computer system, software version data generated by an on-board system of a vehicle remote from the computer system via a network, wherein the software version data indicates a version of software executed by the on-board system to control operational parameters of the vehicle;
   determining, by the one or more processors and based at least upon (i) the software version data and (ii) a known current version of the software, whether a latest software update was installed for the on-board system;
   setting, by the one or more processors and based at least upon whether the latest software update was installed for the on-board system, at least a portion of a driver profile associated with the driver, wherein the driver profile includes a responsibility rating indicative of trustworthiness of the driver, and wherein setting at least the portion of the driver profile includes adjusting the responsibility rating based upon whether the latest software update was installed for the on-board system; and
   transmitting, by the one or more processors of the computer system via the network, the at least the portion of the driver profile to a third party server.

2. The computer-implemented method of claim 1, wherein the network includes a wireless link.

3. The computer-implemented method of claim 1, wherein the third party server is associated with a financial institution that adjusts the credit rating associated with the driver based upon the at least the portion of the driver profile.

4. The computer-implemented method of claim 1, wherein the third party server is associated with an employer that reviews the at least the portion of the driver profile in connection with the job sought by the driver.

5. The computer-implemented method of claim 1, further comprising:
   receiving telematics data that was collected by one or both of (i) one or more electronic subsystems located on or in the vehicle and (ii) a mobile electronic device of the driver or a passenger, wherein the telematics data includes operational data indicative of how the driver operated the vehicle; and
   analyzing, by the one or more processors, the received telematics data to identify a plurality of driving behaviors of the driver,
   wherein setting the at least the portion of the driver profile is further based upon the plurality of driving behaviors.

6. The computer-implemented method of claim 1, further comprising:
   receiving, by the one or more processors, vehicle data generated by the on-board system, wherein the vehicle data includes a plurality of time stamps associated with one or more diagnostic fault codes; and
   determining an amount of time elapsed between two time stamps of the plurality of time stamps,
   wherein setting at least the portion of the driver profile is further based upon the amount of time elapsed.

7. A computer system for monitoring vehicle on-board system software updates, the computer system comprising:
   one or more processors; and
   a non-transitory memory storing instructions that, when executed by the one or more processors, cause the computer system to:
      receive software version data generated by an on-board system of a vehicle remote from the computer system via a network, wherein the software version data indicates a version of software executed by the on-board system to control operational parameters of the vehicle,
      determine, based at least upon (i) the software version data and (ii) a known current version of the software, whether a latest software update was installed for the on-board system,
      set, based at least upon whether the latest software update was installed for the on-board system, at least a portion of a driver profile associated with the driver, wherein the driver profile includes a responsibility rating indicative of trustworthiness of the driver, and wherein setting at least the portion of the driver profile includes adjusting the responsibility rating based upon whether the latest software update was installed for the on-board system, and
      transmit, via the network, at least the portion of the driver profile to a third party server.

8. The computer system of claim 7, wherein the network includes a wireless link.

9. The computer system of claim 7, wherein the third party server is associated with a financial institution that adjusts the credit rating associated with the driver based upon the at least the portion of the driver profile.

10. The computer system of claim 7, wherein the third party server is associated with an employer that reviews the at least the portion of the driver profile in connection with the job sought by the driver.

11. The computer system of claim 7, wherein the instructions further cause the computing system to:

receive telematics data that was collected by one or both of (i) one or more electronic subsystems located on or in the vehicle and (ii) a mobile electronic device of the driver or a passenger, wherein the telematics data includes operational data indicative of how the driver operated the vehicle; and analyze the received telematics data to identify a plurality of driving behaviors of the driver, wherein setting the at least the portion of the driver profile is further based upon the plurality of driving behaviors.

12. The computer system of claim 7, wherein the instructions further cause the computing system to:

receive vehicle data generated by the on-board system, wherein the vehicle data includes a plurality of time stamps associated with one or more diagnostic fault codes; and determine an amount of time elapsed between two time stamps of the plurality of time stamps, wherein setting at least the portion of the driver profile is further based upon the amount of time elapsed.

13. A non-transitory, computer-readable medium for monitoring vehicle on-board system software updates, the non-transitory, computer-readable medium storing instructions that, when executed by one or more processors of a computer system, cause the one or more processors to:

receive software version data generated by an on-board system of a vehicle remote from the computer system via a network, wherein the software version data indicates a version of software executed by the on-board system to control operational parameters of the vehicle;

determine, based at least upon (i) the software version data and (ii) a known current version of the software, whether a latest software update was installed for the on-board system;

set, based at least upon whether the latest software update was installed for the on-board system, at least a portion of a driver profile associated with the driver, wherein the driver profile includes a responsibility rating indicative of trustworthiness of the driver, and wherein setting at least the portion of the driver profile includes adjusting the responsibility rating based upon whether the latest software update was installed for the on-board system; and transmit, via the network, at least the portion of the driver profile to a third party server.

14. The non-transitory, computer-readable medium of claim 13, wherein the network includes a wireless link.

15. The non-transitory, computer-readable medium of claim 13, wherein the third party server is associated with a financial institution that adjusts the credit rating associated with the driver based upon the at least the portion of the driver profile.

16. The non-transitory, computer-readable medium of claim 13, wherein the third party server is associated with an employer that reviews the at least the portion of the driver profile in connection with the job sought by the driver.

17. The non-transitory, computer-readable medium of claim 13, wherein the instructions further cause the one or more processors to:

receive telematics data that was collected by one or both of (i) one or more electronic subsystems located on or in the vehicle and (ii) a mobile electronic device of the driver or a passenger, wherein the telematics data includes operational data indicative of how the driver operated the vehicle; and analyze the received telematics data to identify a plurality of driving behaviors of the driver, wherein setting the at least the portion of the driver profile is further based upon the plurality of driving behaviors.

18. The non-transitory, computer-readable medium of claim 13, wherein the instructions further cause the one or more processors to:

receive vehicle data generated by the on-board system, wherein the vehicle data includes a plurality of time stamps associated with one or more diagnostic fault codes; and determine an amount of time elapsed between two time stamps of the plurality of time stamps, wherein setting at least the portion of the driver profile is further based upon the amount of time elapsed.

* * * * *